US006567848B1

(12) United States Patent
Kusuda et al.

(10) Patent No.: US 6,567,848 B1
(45) Date of Patent: May 20, 2003

(54) SYSTEM FOR COORDINATING COMMUNICATION BETWEEN A TERMINAL REQUESTING CONNECTION WITH ANOTHER TERMINAL WHILE BOTH TERMINALS ACCESSING ONE OF A PLURALITY OF SERVERS UNDER THE MANAGEMENT OF A DISPATCHER

(75) Inventors: Rika Kusuda, Yamato (JP); Yoichi Yoshida, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/416,657

(22) Filed: Oct. 12, 1999

(30) Foreign Application Priority Data

Nov. 10, 1998 (JP) .......................................... 10-318547

(51) Int. Cl.[7] .............................................. G06F 15/16
(52) U.S. Cl. ...................... 709/219; 709/217; 709/218; 709/203; 709/204; 709/205; 705/35; 705/42; 379/93.01; 379/93.09
(58) Field of Search ................................ 709/217–219, 709/203–205; 705/1, 35, 42; 370/352; 379/93.01, 93.09

(56) References Cited

U.S. PATENT DOCUMENTS

| 5,617,540 A | | 4/1997 | Civanlar et al. | |
|---|---|---|---|---|
| 6,130,933 A | * | 10/2000 | Miloslavsky | 379/90.01 |
| 6,173,044 B1 | * | 1/2001 | Hortensius et al. | 379/93.09 |
| 6,212,192 B1 | * | 4/2001 | Mirashrafi et al. | 370/401 |
| 6,240,444 B1 | * | 5/2001 | Fin et al. | 709/205 |
| 6,253,230 B1 | * | 6/2001 | Couland et al. | 709/203 |
| 6,259,774 B1 | * | 7/2001 | Miloslavsky | 379/90.01 |
| 6,317,778 B1 | * | 11/2001 | Dias et al. | 709/214 |
| 6,349,290 B1 | * | 2/2002 | Horowitz et al. | 705/35 |
| 6,370,508 B2 | * | 4/2002 | Beck et al. | 705/1 |
| 6,373,836 B1 | * | 4/2002 | Deryugin et al. | 370/352 |

FOREIGN PATENT DOCUMENTS

| EP | 0 425 161 B1 | 5/1991 |
|---|---|---|
| EP | 0 691 780 A2 | 1/1996 |
| EP | 0 691 780 A3 | 1/1996 |
| EP | 0865180 A2 * | 9/1998 |
| GB | 2 371 730 A | 8/1998 |

OTHER PUBLICATIONS

US Pub No. 2002/0001300 A1.*

* cited by examiner

*Primary Examiner*—Nabil El-Hady
(74) *Attorney, Agent, or Firm*—Scully, Scott, Murphy & Presser; Gail H. Zarick, Esq.

(57) ABSTRACT

An information terminal connected to one of a plurality of servers which are allocated by a dispatcher is connected to another information terminal via its allocated server. When a Web Browser 111 is connected to a Web Server 143 via a Dispatcher 120, a content including a button for requesting the agent side for connection is displayed in the web screen. When the customer clicks this button, a customer ID and an IP address of the server 142 are stored in a table 155. After a CTI Server allocated an agent, an Agent proxy 173 obtains an IP address corresponding to the customer to be connected and accesses to the server 142.

7 Claims, 18 Drawing Sheets

HTTP Response Header                                330

```
HTTP/1.0  200 OK
    server:Netscape-Enterprise/4.0 set cookie:IBMCF_UAI=UAI000001          331

HTTP
Body
    <HTML><Body> ...</BODY></HTML>
```

Figure 4

HTTP Request Header                                 320

```
Get/index.htm HTTP/1.0
HOST:www.a.isp.com
    .
    .
    cookie:IBMCF_UAI=UAI000001              321
    .
    .
    .
```

| Session ID | Customer ID | Collaboration Server Address | Agent ID | AgentID Address |
|---|---|---|---|---|
| 00000001 | C1 | 9.1.1.3 | 1111 | .... |
| 00000002 | C2 | 9.1.1.1 | 2222 | .... |
| 00000003 | C3 | 9.1.1.1 | 3333 | .... |
| 00000004 | C4 | 9.1.1.2 | 4444 | .... |

Client/Agent Matching Table

| Agent Extension Number | Status | Parameter |
|---|---|---|
| 1111 | B | 00000001 |
| . | . | . |
| . | . | . |
| . | . | . |

Agent Managing Table

| Customer ID | Telephone No./ IP Address | Customer Informatoin |
|---|---|---|
| C1 | 03-1234-5678 | |
| . | . | . |
| . | . | . |
| . | . | . |

Customer Information Managing Table

| Customer Information |

Please Fill the Boxes.

1. Name

[_____] 701

2. Your Phone Number

[_____] 703

3. Name of Company/Group/School (Dept. or Faculty)
   Individual Need not Fill.

[_____] 705

4. Please Check Beforehand if Any Item Fits You
   in order to Exchange Smoothly ☐   I am Poor in Operating a Keyboard.
       (Those Who do not Memorize Key Placement
       or has a Hardship to Depress a Keyboard)

☐   I am Poor in Operating a Mouse.
       (Those Who Uses a Special Mouse
       or Uses a Keyboard instead of a Mouse)

☐   I Want to Use a Chat function Because
       I am Handiapped in Hearing or Speaking.

☐   It is Difficult to Watch the Screen or
       I cannot See the Screen.
       I Want to Be Guided by Oral Explanation.

☐   Please Explain Slowly in any way.

710

( OK ) 721

(Cancel) 723

Figure 12

SYSTEM FOR COORDINATING COMMUNICATION BETWEEN A TERMINAL REQUESTING CONNECTION WITH ANOTHER TERMINAL WHILE BOTH TERMINALS ACCESSING ONE OF A PLURALITY OF SERVERS UNDER THE MANAGEMENT OF A DISPATCHER

BACKGROUND OF THE INVENTION

1. Technical Field

The present invention relates to an information processing method and, particularly, to a method of specifying one of a plurality of servers in having such server process a request transmitted from an information terminal via a network, or a method of accessing to such server from another information terminal.

2. Prior Art

An internet comprises a plurality of computer networks which are interconnected so that any computer on a given network can communicate with one or more computers on a given other network. A gateway computer is a computer which interconnects two networks to deliver data from one of the networks to the other.

All computers on the internet communicate via a specific protocol, i.e., the internet protocol (IP). Most of applications use a transmission control protocol (TCP) along with the internet protocol. Thus, the internet is also called a TCP/IP network. A computer connected to the internet is identified by a unique internet address.

The internet routes information using a well known packet exchange technique. Data is transmitted on the internet via a packet (also called an IP packet) having an address associated therewith. A typical internet application may have an electronic mail, an FTP, a Telnet and a network news implemented therein. The communication protocol and application are well known.

The world wide web (i.e., WWW or Web) is an information service system based on the internet. The WWW uses a hyper text and a client/server technique.

The hyper text is a method of constructing and presenting information so that a data object in a hyper test file can have a link to another hyper text file or a data object. For example a user can select a word having a link while a hyper text page is displayed so that the user can move to another hyper text file including other text or picture(s) which describes about that word (the new file may also have a link to further hyper text file and so on).

Many of the hyper text files are currently structured using the hyper text mark-up language (HTML). The hyper text data object may be in the form of any information medium including a text, an image, a voice, a moving picture or an executable computer program. Any hyper text file on the web is uniquely identified by its universal resource locator (URL).

A Web Client or a client (typically, a computer which executes a program called a browser) is essentially a hyper text reader communicating with a Web Server via a specific data transfer protocol such as a hyper text transfer protocol (HTTP). The client requests a hyper text file using the URL to display the file on a graphical user interface (GUI). This display is called a web page. The client can return specific data to the server and call a common gateway interface (CGI) program on the server computer to perform a specific task. Netscape Navigator and Internet Explorer are currently known as a typical browser. Netscape Navigator is a trademark of Netscape Communications Corporation while Internet Explorer is a trademark of Microsoft Corporation.

The WWW allows a user located anywhere on the internet to transmit a hyper text file via the WWW and retrieve any hyper text file in the world as easily as a local hard disk. The user is thus provided with a powerful tool to obtain information and the internet becomes a hyper media global database, i.e., an information super highway.

The internet and the WWW have been explosively expanded recently. Enterprises also envision a large possibility of using the internet and the WWW as a next generation worldwide communication infra structure to enter a tremendously large consumer market.

A collaboration technology has been proposed in such internet technology to allow a plurality of users to simultaneously collaborate (view, move or modify) on an HTML page as seen in Japanese Publn. No. 10-124461. FIG. 19 is a diagram showing an example where a collaboration of the HTML page is applied to an internet banking system. A bank agent can refer to a same page as one referred to by a customer and operate upon it by using such technology.

However, HTML data which a plurality of collaborating users obtain needs to be synchronized because there exists an HTML page in which the content changes as time goes such as a page of stock price information and a page containing a moving picture. Therefore, when one of the plurality of collaborating users transmits an HTML request, there was a need to introduce a collaboration server which caches the content of a response to the request and distributes it to other collaborating members. However, when the number of customers and agents dealing therewith or the amount of data handled increases in such collaboration system, the collaboration server is heavily loaded and it is afraid that the processing time is extended with resulting degraded services.

On the other hand, while several tens thousands of access requests come to a favorite web site such as a news flash of Olympic games, there is a technology which makes a plurality of servers look virtually like a single server to process the requests without degrading the performance (FIG. 20). While the requests are processed by a plurality of servers actually in this technology, the address as seen from the accessing side is only one (www.olympic.co.jp, in the example of FIG. 20) and the servers look like a single server. An example of such product is "eNetwork Dispatcher V2.0" (eNetwork Dispatcher is a trademark of International Business Machines Corporation). While this network dispatcher looks like a single server as seen from a client, it has a plurality of servers in a cluster. When a request is received from a client, load information of the plurality of servers is determined to allocate the request from the client to the server having the least load.

However, the following problems are involved in applying such dispatching technique to the collaboration technology.

1. It is impossible to know to which server in the cluster the actual request is allocated.
2. When it is wanted to access to a server in the cluster without the dispatcher intervened, the address of the cluster (URL), i.e., www.olympic.co.jp (9.1.1.4) can not be used. This is because the dispatcher allocates the request to the least loaded server in the manner similar to a normal request.

Therefore, a technology of specifying a server in a cluster allocated by a dispatcher and connecting an agent to that server is needed.

SUMMARY OF THE INVENTION

It is an object of this invention to specify one of a plurality of servers in having such one of the servers process a request transmitted from an information terminal via a network.

It is another object of this invention to access to one of a plurality of servers from an information terminal in having such one of the servers process a request transmitted from another information terminal via a network.

It is another object of this invention to provide a computer system which does not depend on a platform of an operated information terminal.

It is another object of this invention to access to one of a plurality of servers from an information terminal without a dispatcher intervened in having such one of the servers process a request transmitted from another information terminal via a network.

It is a further object of this invention to assign an agent having a skill which fits the content of customer's query in an internet call center.

It is a further object of this invention to provide a system which can notify a customer side of the availability status of agents and allows the customer side to select whether to wait connection to the agent in an internet call center.

It is a further object of this invention to provide a system which deals with a case where the skill of the agent does not match the content of customer's query in the internet call center after it is connected to the customer and reduces a work load such as transferring to an agent having a skill which matches the content of the query.

It is a further object of this invention to provide a system which can inform beforehand its own condition in contacting an agent to enable a smooth communication in the internet call center.

The present invention is directed to a method of communicating between a first information terminal and a second information terminal, said method comprising the steps of;
  (a) sending a first request sent to an address of a cluster of a dispatcher from said first information terminal to one of a plurality of servers managed by said dispatcher,
  (b) allocating information which can specify said first information terminal in said one of the servers,
  (c) receiving a second request requesting connection to the second information terminal from said first information terminal in said one of the servers,
  (d) storing said information which can specify said first information terminal and the information which can specify said one of the servers in correlation to each other,
  (e) specifying a second information terminal to be connected to said one of the servers,
  (f) accessing to said one of the servers from said second information terminal based on the information specifying said one of the servers which were stored in the step (d), and
  (g) communicating between said first information terminal and said second information terminal.

The term "information which can specify the first information terminal" is a concept including a customer ID to be described later in the embodiment of this invention. Also, the term "information which can specify the second information terminal" is a concept including an extension number of an agent to be described later in the embodiment of this invention as well as the employee number and the user ID of the agent. Further, the term "information which can specify one of the servers" is a concept including the IP address to be described later in the embodiment of this invention.

The present invention is further directed to a method of communicating between a first information terminal and a second information terminal, said method comprising the steps of;
  (a) sending a first request sent from a Web Browser of a first information terminal to an address of a cluster of a dispatcher to a Web Server of one of a plurality of servers managed by said dispatcher,
  (b) allocating information which can specify said first information terminal in said one of the servers,
  (c) sending to said first information terminal a response including a content which displays information which can specify said first information terminal, an object instructing to connect to a second information terminal, and an entry for inputting a telephone number of the operator of said first information terminal on a display device of said first information terminal,
  (d) receiving a second request requesting connection to the second information terminal and including information which can specify said first information terminal and a telephone number of the operator of said first information terminal, said second request being generated by operating said object in said first information terminal,
  (e) storing said information which can specify said first information terminal and the information which can specify said one of the servers in correlation to each other,
  (f) storing the telephone number of the operator of said first information terminal and information which can specify said first information terminal in correlation to each other,
  (g) specifying a second information terminal to be connected to said one of the servers,
  (h) storing information which can specify said second information terminal and information which can specify said first information terminal in correlation to each other,
  (i) accessing to said one of the servers from said second information terminal based on the information specifying said one of the servers which were stored in the step (e), and
  (j) communicating between said first information terminal and said second information terminal.
  (k) sending a third request instructing a voice connection and including information which can specify the telephone number of the operator of said second information terminal in response to an operation instructing a voice connection of said second information terminal, and
  (l) connecting the telephone of the operator of said first information terminal to the telephone of the operator of said second information terminal in response to the third request.

The term "object instructing connection to the second information terminal" is a concept including "Call up" button to be described in the embodiment of this invention.

Still further, the present invention is directed to a method of communicating between a first information terminal and a second information terminal, said method comprising the steps of;

(a) connecting said first information terminal to one of a plurality of servers based on address information sent to said one of the servers which can support said first information terminal, said address information being obtained by said first information terminal from a dispatcher, (b) storing information which can specify said first information terminal and information which can specify said one of the servers in correlation to each other, (c) connecting a second information terminal desiring communication with said first information terminal to said one of the servers based on information specifying the one of the servers which was stored in said step (b), and (d) communicating between said first information terminal and said second information terminal.

Still even further, the present invention relates to a method of accessing to one of a plurality of servers which are under the management of a dispatcher, said method comprising the steps of;

(a) storing information which can specify one of the servers managed by said dispatcher and is accessed from a first information terminal via said dispatcher, and information which can specify said first information terminal in correlation to each other, and (b) accessing to said one of the servers from a second information terminal based on information specifying the one of the servers which was stored in said step (a).

Yet further, the present invention provides a communication system supporting communication between a first information terminal and a second information terminal, said system comprising;

(a) a Dispatcher for managing a plurality of servers and allocating a first request from the first information terminal to one of said plurality of servers, (b) a UAI Manager for allocating information which can specify said first information terminal, (c) a Collaboration Manager for supporting a Collaboration Software installed in said first and said second information terminals, (d) a CTI Interface for managing a managing table which stores information which can specify said first information terminal and information which can specify said second information terminal in correlation to each other, (e) a CTI Server for specifying the second information terminal to be connected to said first information terminal, and (f) an Agent Proxy for accessing to said one of the servers based on information obtained from said managing table and specifying said one of the servers.

Still further, the present invention is directed to a communication system supporting communication between a first information terminal and a second information terminal, said system comprising;

(a) a Web Browser for sending a first request from the first information terminal, (b) a Dispatcher for managing a plurality of servers and allocating a first request to one of said plurality of servers, (c) a UAI Manager for allocating information which can specify said first information terminal, (d) a Web Server for sending to said first information terminal a response including a content which displays information which can specify said first information terminal, an object instructing to connect to a second information terminal, and an entry for inputting a telephone number of the operator of said first information terminal on a display device of said first information terminal, (e) a CTI Interface for sending a message instructing to specify the second information terminal which is to communicate with said first information terminal in response to transmission of a second request requesting connection to the second information terminal and including information which can specify said first information terminal and a telephone number of the operator of said first information terminal, said second request being generated by operating said object in said first information terminal, (f) a Matching Table for storing the information which can specify said first information terminal, the information which can specify said second information terminal and information which can specify said one of the servers in correlation to each other, (g) a Managing Table for storing the telephone number of the operator of said first information terminal and information which can specify said first information terminal in correlation to each other, (h) an Agent Proxy for accessing to said one of the servers from said second information terminal based on the information specifying said one of the servers which is obtained from said matching table, (i) a CTI Server/Client Application for sending a third request instructing a voice connection and including information which can specify the telephone number of the operator of said second information terminal in response to an operation instructing a voice connection of said second information terminal, and (j) a PBX for connecting the telephone of the operator of said first information terminal to the telephone of the operator of said second information terminal in response to the third request.

Yet still even further, the present invention is directed to a recording medium storing a control program for accessing to one of a plurality of servers which are under the management of a dispatcher, said program including a program code which instructs to access to a managing table storing information which can specify the one of the servers accessed from said first information terminal via said dispatcher and information which can specify said first information terminal in correlation to each other, and to access to said one of the servers from said second information terminal based on information specifying the one of the servers which is stored in said managing table.

BRIEF DESCRIPTION OF THE DRAWINGS

Preferred embodiments of the present invention will now be described, by way of example only, with reference to the accompanying drawings in which:

FIG. 4 is a schematic chart of the HTTP response header in the preferred embodiment of this invention.

FIG. 5 is a schematic chart of the HTTP request header in the preferred embodiment of this invention.

FIG. 6 is a schematic chart of the Client/Agent Matching Table in the preferred embodiment of this invention.

FIG. 7 is a schematic chart of the agent managing table in the preferred embodiment of this invention.

FIG. 8 is a schematic chart of the customer managing table in the preferred embodiment of this invention.

FIG. 12 is a chart showing a customer information input screen in the preferred embodiment of this invention.

DETAILED DESCRIPTION OF THE PREFERRED EMBODIMENTS OF THE INVENTION

Figure 1:
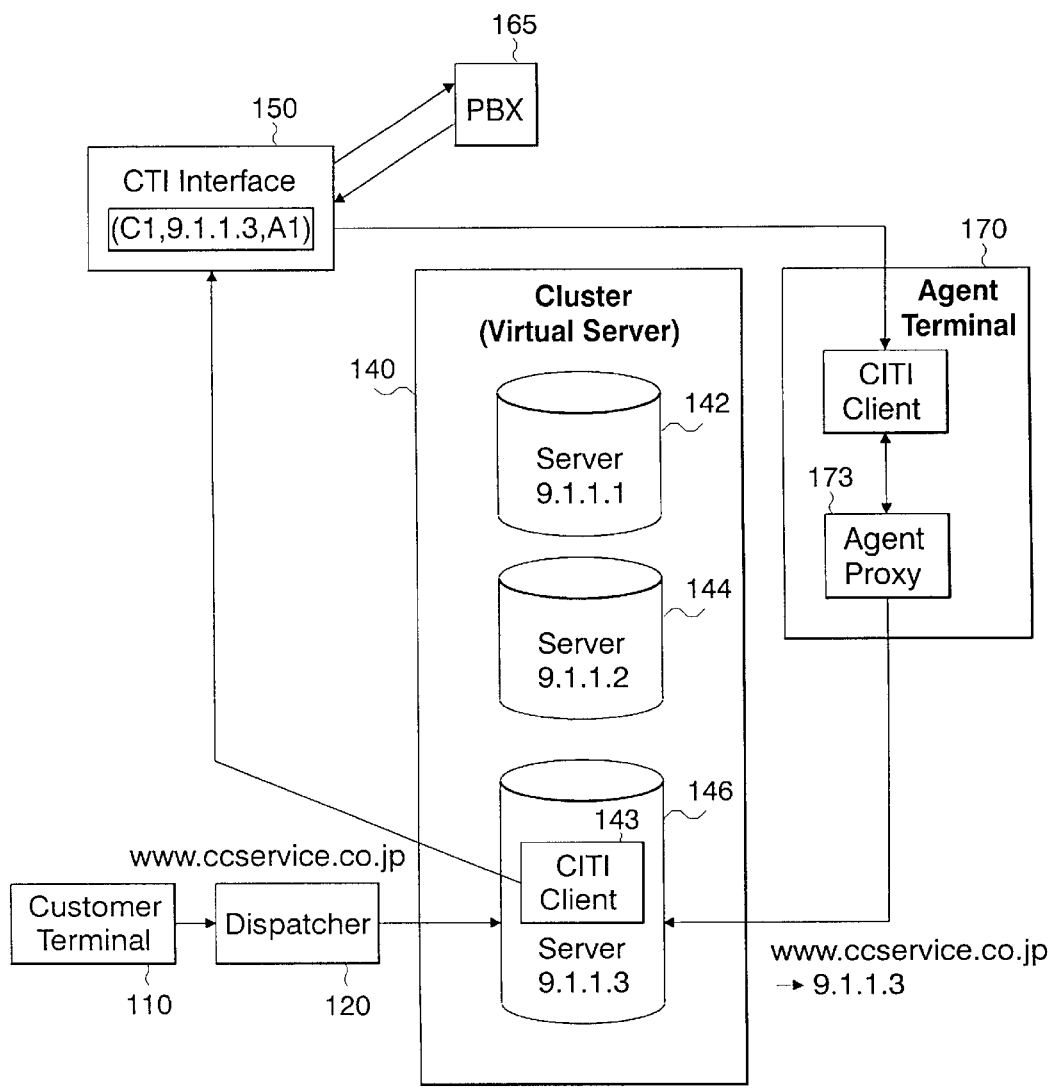
FIG. 1 is a schematic diagram of the information terminal in the preferred embodiment of this invention.

An embodiment of this invention is now described with reference to the drawings. FIG. 1 is a schematic diagram of a computer system in a preferred embodiment of this invention. In an Information Terminal 110 in the client side, a Web Browser such as Netscape Navigator (Netscape Navigator is a trademark of Netscape Corporation) and Internet Explorer (Internet Explorer is a trademark of Microsoft Corporation) is installed.

First of all, an HTTP request is sent from a Web Browser in the client side to access to www.ccservice.co.jp. A dispatcher 120 dispatches the HTTP request sent from the client side to a suitable server taking the load of servers 142, 144, 146 into consideration. In this example, an IP address is dispatched to a 9.1.1.3 server 146. In this preferred embodiment, the servers 142, 144, 146 are provided as a collaboration server. The collaboration server correlates the Information Terminal 110 in the customer side to an information terminal of an agent side and provides a control to cause same data to be sent to the correlated browsers in the terminals. The collaboration server delivers a client ID to the client side using "cookie" method when the HTTP request is not assigned a client ID.

A CTI (Computer Telephony Integration) Client notifies a CTI Interface Machine 150 that it is connected from a client. In the preferred embodiment of this invention, the parameter of the message then sent out is a client ID and an IP address of the server. The CTI Interface Machine 150 issues a request to allocate an agent to a PBX 165 and the like and obtains an agent ID of the allocated agent. The CTI Interface Machine 150 also generates a set of a client ID, an IP address of a server and an agent ID.

The CTI Interface Machine 150 delivers an IP address of a server to an Agent Proxy of the agent side. The agent also accesses using www.ccservice.co.jp which is the address of the cluster. Then, the Agent Proxy of the agent side converts www.ccservice.co.jp to the IP address (9.1.1.3) of the server 146 to cause the server 146 to which the client is connected to be accessed.

Figure 2:
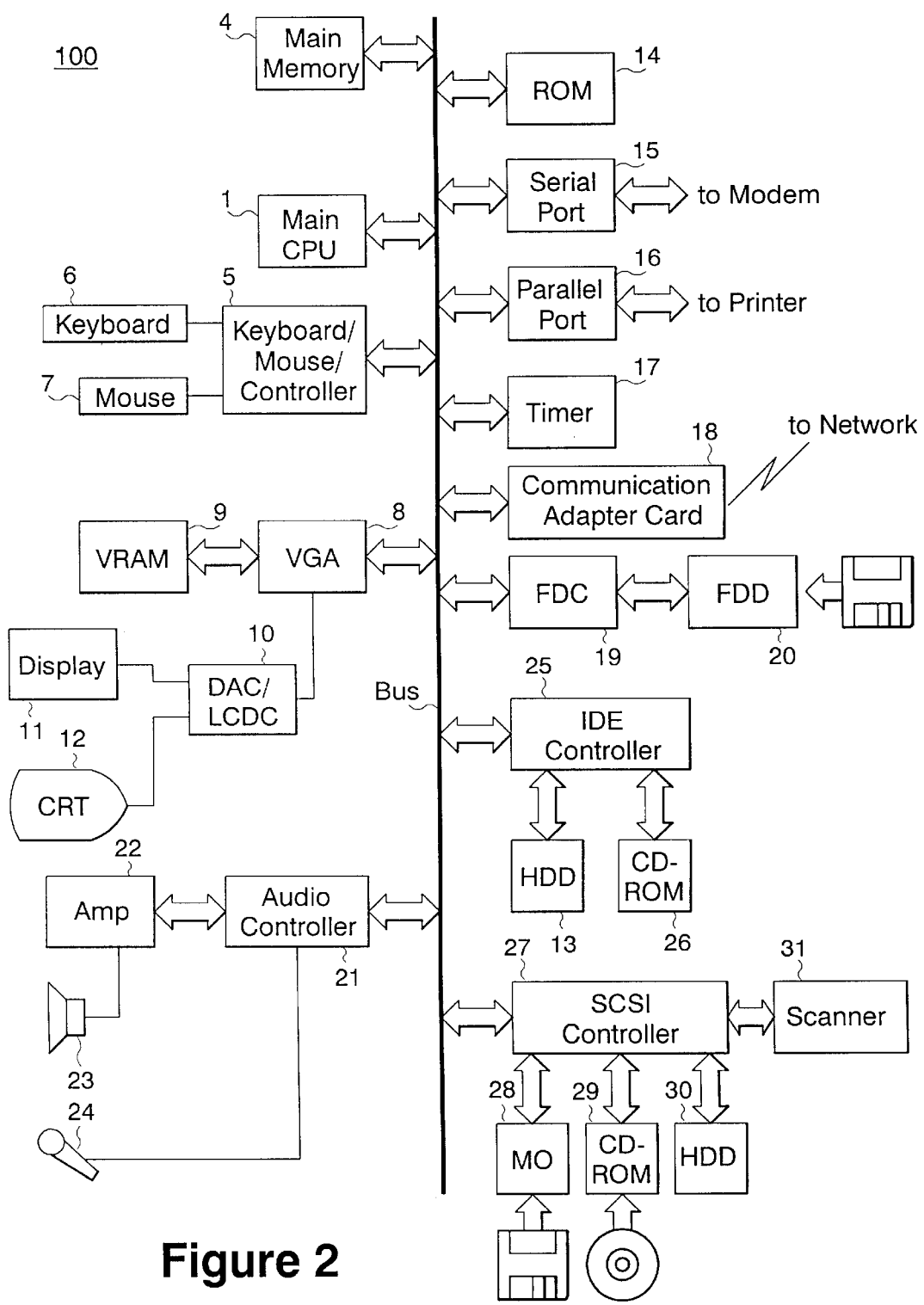
FIG. 2 is a block diagram of a hardware configuration of an information terminal supporting server or an information terminal.

FIG. 2 shows a schematic diagram of a hardware configuration of an information terminal supporting server 100 used in this invention. The information terminal supporting server 100 comprises a central processing unit (CPU) 1 and a memory 4. The CPU 1 and the memory 4 are connected to a hard disk device 13 as an auxiliary storage via a bus 2. A floppy disk device 20 (or recording medium drives 26, 28, 29 such as an MO and CD-ROM) is connected to the bus 2 through a floppy disk controller 19 (or an IDE controller 25, an SCSI controller 27, etc.).

A floppy disk (or recording medium such as an MO and CD-ROM) is inserted to the floppy disk device 20 (or recording medium drives such as an MO and CD-ROM). A computer program code which gives instructions to the CPU and the like in cooperation with an operating system to practice this invention is recorded in the floppy disk, the hard disk device 13, 30, and a ROM 14 and executed by being loaded in the memory 4. The computer program code may be compressed or divided into pieces for recording in a plurality of media.

Further, the information terminal supporting server 100 may be provided with a user interface hardware including a pointing device 7 (a mouse and a joystick, etc.) or a keyboard 6 for inputting, and a display 12 for presenting visual data to the user. A touch panel may be used as an input means. Further, a printer may be connected via a parallel port 16 and a modem may be connected via a serial port 15. The information terminal supporting server 100 can be connected to a network via the serial port 15 and the modem or a communication adapter 18 (Ethernet an token ring cards) for communication with other computers and the like.

A speaker 23 receives an audio signal which is D/A (digital/analog conversion) converted by an audio controller 21 via an amplifier 22 for output as a voice. The audio controller 21 A/D (analog/digital) converts vioce information received from a microphone 24 to allow voice information external to the system to be taken in the system.

As such, it will be readily understood that the information terminal supporting server 100 of this invention may be practiced by a conventional personal computer (PC), a workstation, a notebook PC, a palm top PC, an information terminal having a communication function such as a network computer, or a combination thereof. It should be noted, however, that these components are given for exemplary purpose and it is not meant that all of these components are the indispensable components of this invention.

Because the hardware configuration described here includes components which are not indispensable for the control of a request from an information terminal, the audio controller 21 required for processing a voice, the amplifier 22, the speaker 23, the microphone 24, the keyboard 6, the mouse 7 and the keyboard/mouse controller 5 which enables a direct input from an operator, the CRT 12, the display device 11, the VRAM 9, the VGA 8 for presenting visual data to a user, and the recording medium processing devices 19, 25, 27 are not necessary.

Various modifications of the components of the information supporting server 100 such as a combination of a plurality of machines and distribution of functions thereto may be easily conceived and is a concept which is included in this invention.

The Information Terminals 110, 170, 172, 174 used in this invention may be also implemented by the hardware configuration shown in FIG. 2 in the manner similar to the information terminal supporting server 100. It will be similarly understood that the Information Terminals 110, 170, 172, 174 may be implemented by a conventional personal computer (PC), a workstation, a notebook PC, a palm top PC, home appliances such as a television set having a computer internally installed, a game machine having a communication function, or a combination thereof, because it is only required for the Information Terminals 110, 170, 172, 174 to have a function to input a request to obtain information and send it out. These components are shown exemplarily and it is not meant that all of them are the indispensable components of this invention.

The operating system in the information terminal supporting server 100 side may include an operating system which supports a GUI multi-windows environment as a standard such as WindowsNT (a trademark of Microsoft Corporation), Windows95 (a trademark of Microsoft Corporation), Windows3.x (a trademark of Microsoft Corporation), OS/2 (a trademark of International Business Machines Corporation), MacOS (a trademark of Apple Corporation), X-WINDOW System (a trademark of MIT) on AIX (a trademark of International Business Machines Corporation), an operating system in a character based environment such as PC-DOS (a trademark of International Business Machines Corporation), MS-DOS (a trademark of Microsoft Corporation), a real time OS such as OS/Open (a trademark of International Business Machines Corporation), VxWorks (a trademark of Wind River System, Inc), and an OS embedded in a network computer such as JavaOS, without being limited to any specific operating system environment.

The operating system in the Information Terminal 110 may include not only an operating system which supports a GUI multi-windows environment as a standard such as WindowsNT (a trademark of Microsoft Corporation), Windows95 (a trademark of Microsoft Corporation), Windows3.x (a trademark of Microsoft Corporation), OS/2 (a trademark of International Business Machines Corporation), MacOS (a trademark of Apple Corporation), X-WINDOW System (a trademark of MIT) on AIX (a trademark of International Business Machines Corporation), an operating system in a character based environment such as PC-DOS (a trademark of International Business Machines Corporation), MS-DOS (a trademark of Microsoft Corporation), a real time OS such as OS/Open (a trademark of International Business Machines Corporation), VxWorks (a trademark of Wind River System, Inc), and an OS embedded in a network computer such as JavaOS, but also Zauls OS use in Zauls without being limited to any specific operating system environment.

Figure 3A:
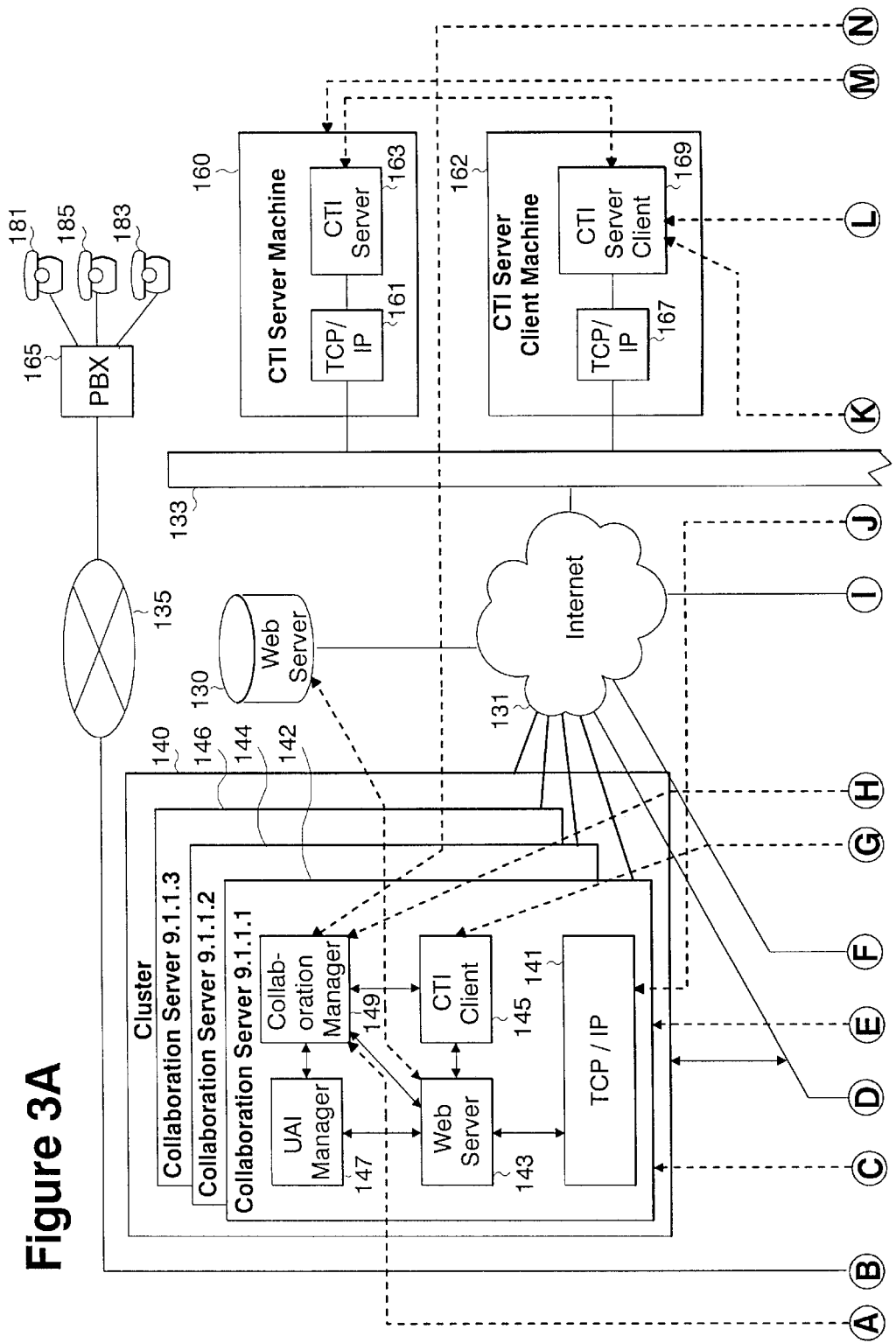
FIGS. 3A and 3B show a block diagram of processing components in the preferred embodiment of this invention.
Figure 3B:
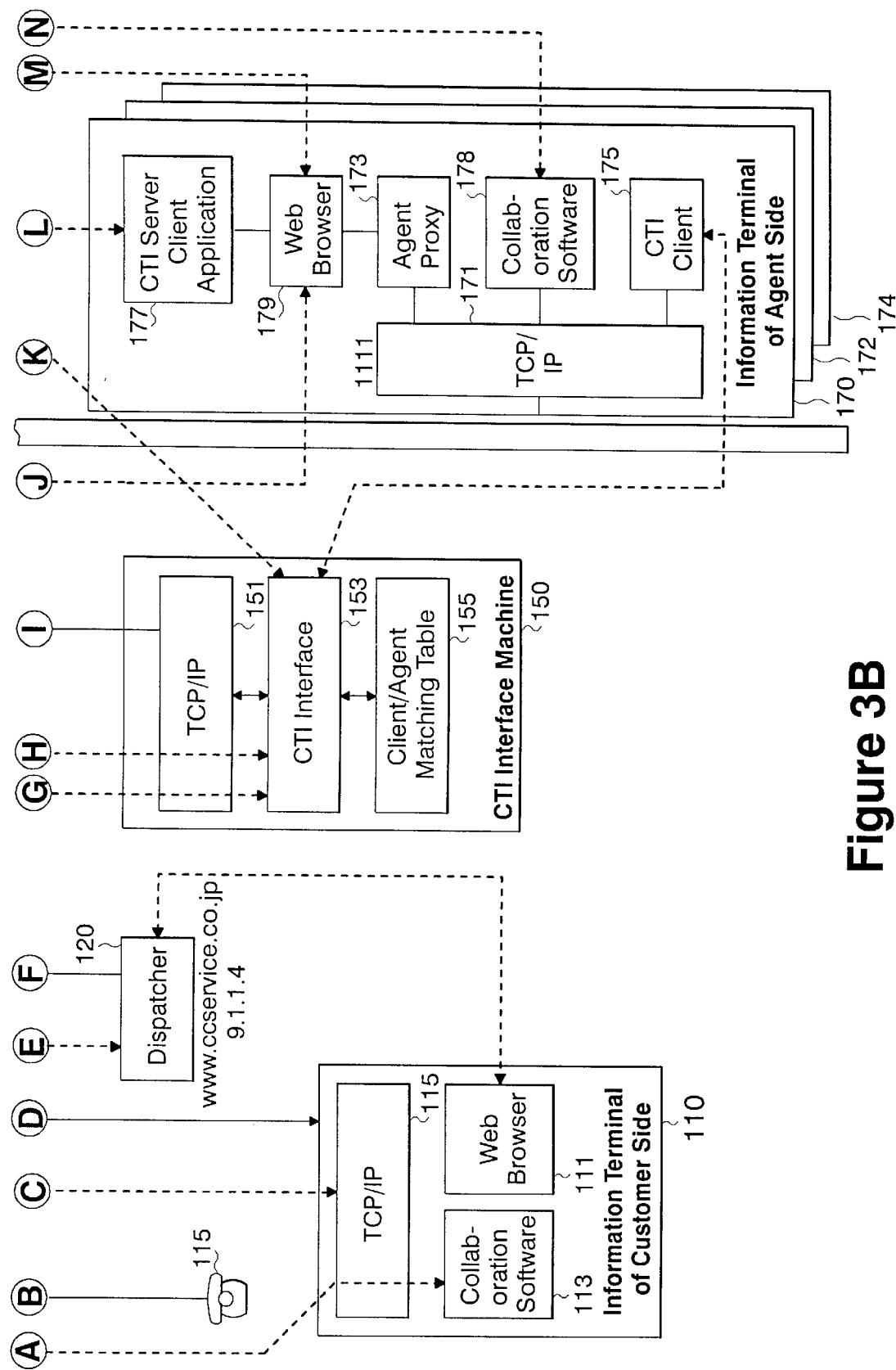

FIGS. 3A and 3B form a functional block diagram showing the system configuration of a collaboration system which includes the information terminal supporting server (collaboration server) 100 in the preferred embodiment of this invention.

The collaboration system in the preferred embodiment of this invention comprises an Information Terminal (in the customer side) 110, a Dispatcher 120, a Cluster 140, a CTI Interface Machine 150, a CTI Server Machine 160, a CTI Server Client Machine 162, a PBX 165, Information Terminals (in the agent side) 170, 172, 174 and telephone sets 115, 181, 183, 185.

In the preferred embodiment of this invention, a Web Browser 111 and a Collaboration Software 113 are mounted on the Information Terminal 110. The Web Browser 111 designates a URL and sends a request to a predetermined Web Server via the internet 131. The Web Browser 111 also receives a response sent from the Web Servers 143 and 130 and displays it on the display screen.

The Collaboration Software 113 sends screen change information and annotation data to the Collaboration Software 178 of the agent side via a Collaboration Manager to be described later. It also provides a remote operation function of other terminal. The collaboration technology is not described in detail in this specification because it is known in the art as seen in Japanese Publn. No. 10-124461.

The Dispatcher 120 determines load information of the servers 142, 144, 146 in the Cluster 140 and allocates a request from a client to the least loaded server. In the preferred embodiment of this invention, the Dispatcher 120 has a Sticky function which allocates a request of a specific Web Browser 111 to the Collaboration Servers 142, 144, 146 once allocated. This function is known in the art and provides a control by having the Dispatcher 120 internally hold a set of IP addresses of once allocated Web Browser 111 and Collaboration Server 142 for a given period of time.

The Cluster 140 is a virtual server and behaves as if it is a server as seen from the client. The cluster is set up actually by registering to which server the Dispatcher 120 allows a request to be allocated.

In the preferred embodiment of this invention, the Cluster 140 which is a virtual server is provided with a plurality of Collaboration Servers 142, 144, 146. Each of the Collaboration Servers 142, 144, 146 is further provided with a TCP/IP 141, a Web Server 143, a CTI Client 145, a UAI Manager 147, and a Collaboration Manager 149.

The TCP/IP 141 is an interface supporting the protocol of TCP/IP. The Web Server (collaboration Web Server) 143 returns an HTML for the designated URL in response to a request sent from the Web Browser 111. The collaboration Web Server 143 checks the authority of accessing to the collaboration Web Server 143 and instructs generation of an UAI. It also notifies the CTI Client of arrival of the request. The collaboration Web Server 143 in the preferred embodiment of this invention may further access to another Web Server 130 to obtain its content and send it to the Web Server of the customer side.

The UAI Manager 147 allocates an UAI which the Web Browser of the client side can uniquely identify in response to the instruction by the Web Server. The CTI Client 145 delivers the value of the UAI and its own IP address to the CTI Interface 153 of the CTI Interface Machine 150. The UAI which the UAI Manager 147 allocated is sent to the Web Browser 111 of the customer side from the Web Server 143. The Collaboration Manager 149 supports the Collaboration Software 113 of the customer side and the Collaboration Software 178 of the agent side so as to allow communication beyond a firewall. The Collaboration Softwares distribute common web information so that same information is obtained in the customer and the agent sides even if it is external web information which varies all the time.

FIG. 4 is a conceptual chart of an HTTP response header in the preferred embodiment of this invention. As shown in FIG. 4, a UAI is included in the HTTP response header sent from the Web Server to the Web Browser 111. The Web Browser 111 receiving the UAI will include the UAI information in its header portion in sending a subsequent request. FIG. 5 is a conceptual chart of an HTTP request from the Web Browser 111 after the UAI in the preferred embodiment of this invention is obtained.

The CTI Interface Machine 150 is provided with a TCP/IP 151, a CTI Interface 153, and a client-agent matching table 155. The CTI Interface 153 manages the client-agent matching table 155 and exchanges information managed in this table between the Collaboration Servers 142, 144, 146 and the Information Terminal 170, 172, 174 in the agent side to allow an agent to access to a collaboration server to which a customer assigned to that agent accesses.

The client-agent matching table 155 is a matching table which provides a control to allow a common collaboration server to be accessed from both the Web Browser of the client side and the Web Browser of the agent side.

As shown in FIG. 6, the client-agent matching table 155 in the preferred embodiment of this invention manages information of a session ID 157, a customer ID 152, a collaboration server address 154, and an agent ID 156. Such information is for uniquely specifying a session between a customer and an agent, the Web Browser 111 of the customer side, the Collaboration Server 142, 144, 146, and the telephone number and the Web Browser 179 of the agent side.

The CTI Server Machine 160 in the preferred embodiment of this invention includes a TCP/IP 161 and a CTI Server 163. The CTI Server 163 in the preferred embodiment of this invention controls the PBX 165, manages the status of the agent and holds customer information in response to a request by the CTI Server Client 169.

The control of the PBX 165 includes execution of an API issued in the CTI Server Client 169 and issuance of indication to the PBX 165 to make an external call to the telephone of the customer side.

The status management of the agent includes accessing to an agent managing table 220 to refer to information of the status of each agent, and rewriting the status depending on the content of a completion notice of the indication given to the PBX 165.

FIG. 7 is a conceptual chart of the agent managing table 220 which the CTI Server manages in the preferred embodiment of this invention. As shown in FIG. 7, an agent ID (extension number of the agent) 221, a status 223, and a parameter 225 are stored in the agent managing table 220.

While the agent ID 221 matches the extension number of the agent in the preferred embodiment of this invention, it may be any other information such as an employee number which can uniquely specify the agent in the system. The status 223 manages the status of the agent such as whether the agent has logged in the system, is busy or is in the state waiting a work.

The parameter 225 specifies a responsible area of each agent. In the internet banking, for example, different parameters are allocated for different areas such as an agent for opening an account, an agent for transferring to an account, and an agent for dealing with a system trouble. In the preferred embodiment of this invention, the HTTP request includes information identifying the kind of services which are desired to be provided from the agent and the CTI Server 163 allocates the agent taking the identifying information into consideration.

Management of customer information includes obtaining customer information included in an HTTP request which is sent from the customer side via the CTI Interface 153 and the CTI Server Client 169, etc., and storing it in the customer managing table 240 which the CTI Server 163 manages. It also includes obtaining customer information from the customer managing table 240 in the CTI Server 163 in response to a request for obtaining customer information sent from the CTI Server Client Application 177 via the CTI Server Client 169.

FIG. 8 is a conceptual chart of the customer managing table 240 in the preferred embodiment of this invention. The customer managing table in the preferred embodiment of this invention manages a customer ID 241, a customer's external telephone number/IP address 243, and customer information 245.

In the preferred embodiment of this invention, a customer's external telephone number or an IP address (or the name of the host) is stored in a customer's external telephone number/IP address 243. The CTI Server Client Application 177 looks into the customer information obtained from the CTI Server 163 to determine which of telephone conversations via the internet or a normal external telephone the customer wants.

The customer information 245 can hold not only customer's name/position information but also customer's desire such as "poor in keyboard operation", "poor in mouse operation", "desire visual communication", and "desire a slow explanation" as described later.

The PBX 165 makes an actual telephone call to the telephone 181, 183, 185 of the agent or the telephone 115 of the customer. When the agent does not respond to the extension telephone, the PBX 165 notifies the CTI Server 163 that the agent does not respond and the CTI Server 163, in receiving this notice, assigns another agent in the preferred embodiment of this invention.

While allocation of the agent may be done by the CTI Server 163, the PBX 165 and the like can also specify the agent in another mode of this invention. For example, an IVR (Interactive Voice Response) function is installed in addition to the PBX 165 to specify the agent as the customer desires. Specifically, the IVR function allows the customer to select a group of desired agents and specify an agent in the selected group of agents by pushing a push phone according to a voice guidance given from a telephone set.

The CTI Server Client Machine 162 comprises a TCP/IP (CTI Server Client) 167, and a CTI Server Client 169. The CTI Server Client 169 manages input/output of the CTI Server 163 and allows the CTI Interface 153 and the CTI Server Client Application 177 to use the CTI Server 163 without being aware of the CTI Server 163.

The CTI Server Client 169 issues a request for allocating an agent and a request for setting customer information, etc., to the CTI Server 163 in response to a request from the CTI Interface, and issues a request for making an external call of a telephone and a request for obtaining customer information in response to a request from the CTI Server Client Application 177.

As shown in the figure, each of the Information Terminals 170, 172, 174 is provided with a TCP/IP 171, an Agent Proxy 173, a CTI Client 175, a CTI Server Client Application 177, a Collaboration Software 178 and a Web Browser 179.

The Agent Proxy 173 holds an IP address which is notified as being an address of a collaboration server to be accessed and converts the destination of a request to a predetermined host name to the IP address so held.

The CTI Client 175 interfaces with the CTI Interface 153. The CTI Server Client Application 177 detects that the agent is allocated to a customer and starts a Web Browser 179 using the predetermined host name as a URL. It also sends out an indication to the CTI Server 163 via the CTI Server Client 169 to obtain customer information managed by the CTI Server and to make an external call.

The Web Browser 179 sends a request to a predetermined Web Server specified by the URL via the Firewall 133 and the internet 131 in the manner similar to the Web Server 111 of the client side. It also receives a response sent from the Web Server 143, 130 and displays it on a display screen. The Collaboration Software 178 sends screen change information and annotation data in the manner similar to the Collaboration Software 113 of the customer side. It also provides a remote control function of the information terminal of the customer side.

While the functional blocks shown in FIG. 3 have been described, they are logical functional blocks and it is not meant that each of them is implemented in the form of a discrete hardware or a software. They may be implemented by a composite or a common hardware or software. Also, it is not meant that all the functional blocks shown in FIG. 3 are indispensable components of this invention. For example, the function of the CTI Interface Machine 150 may be implemented into one of the collaboration servers or the CTI Server Machine 160 and the CTI Server Client Machine 162 can be implemented in a single machine.

Figure 9:
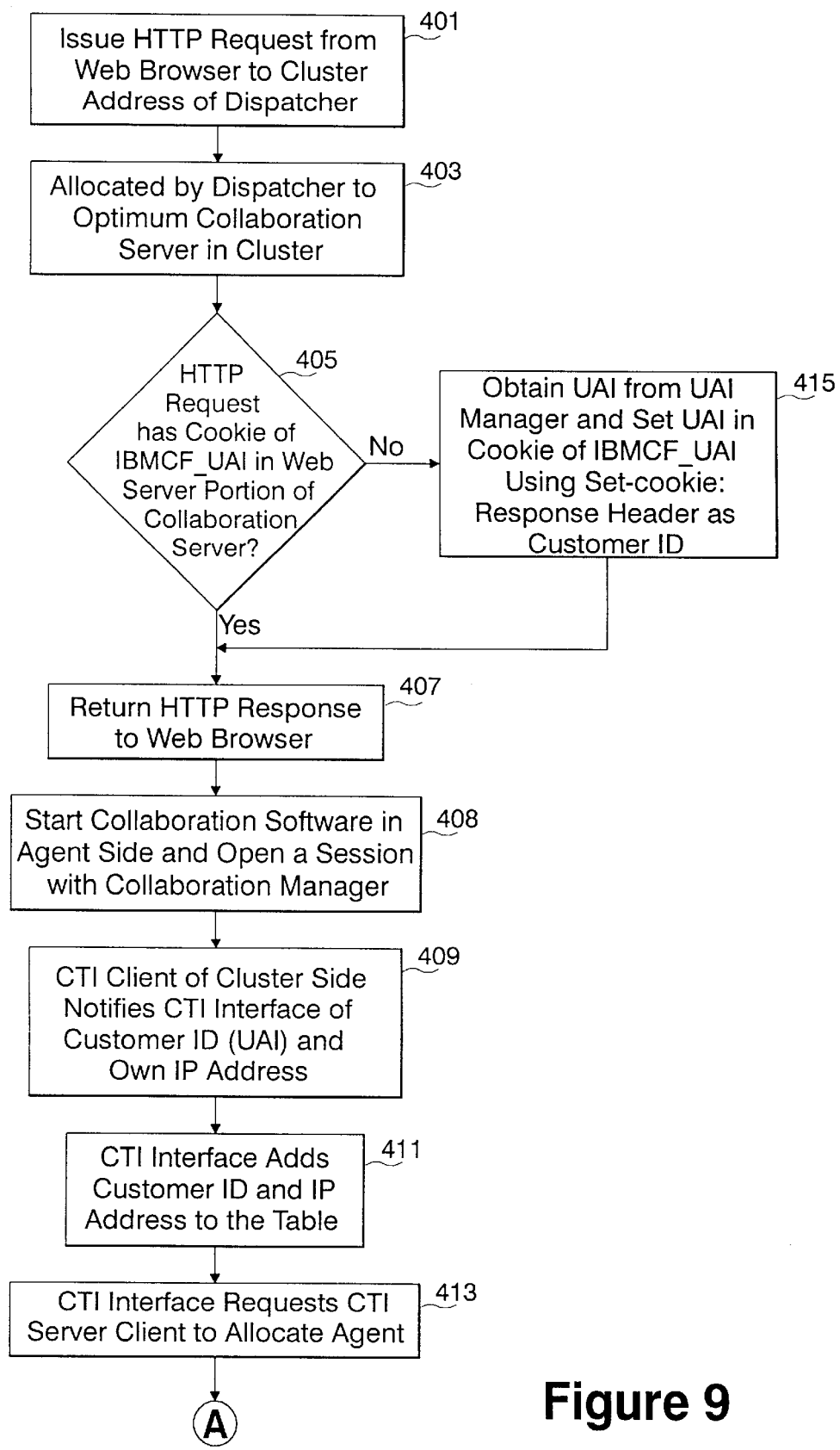
FIG. 9 is a flow chart explaining the processing procedure in the preferred embodiment of this invention.
Figure 10:
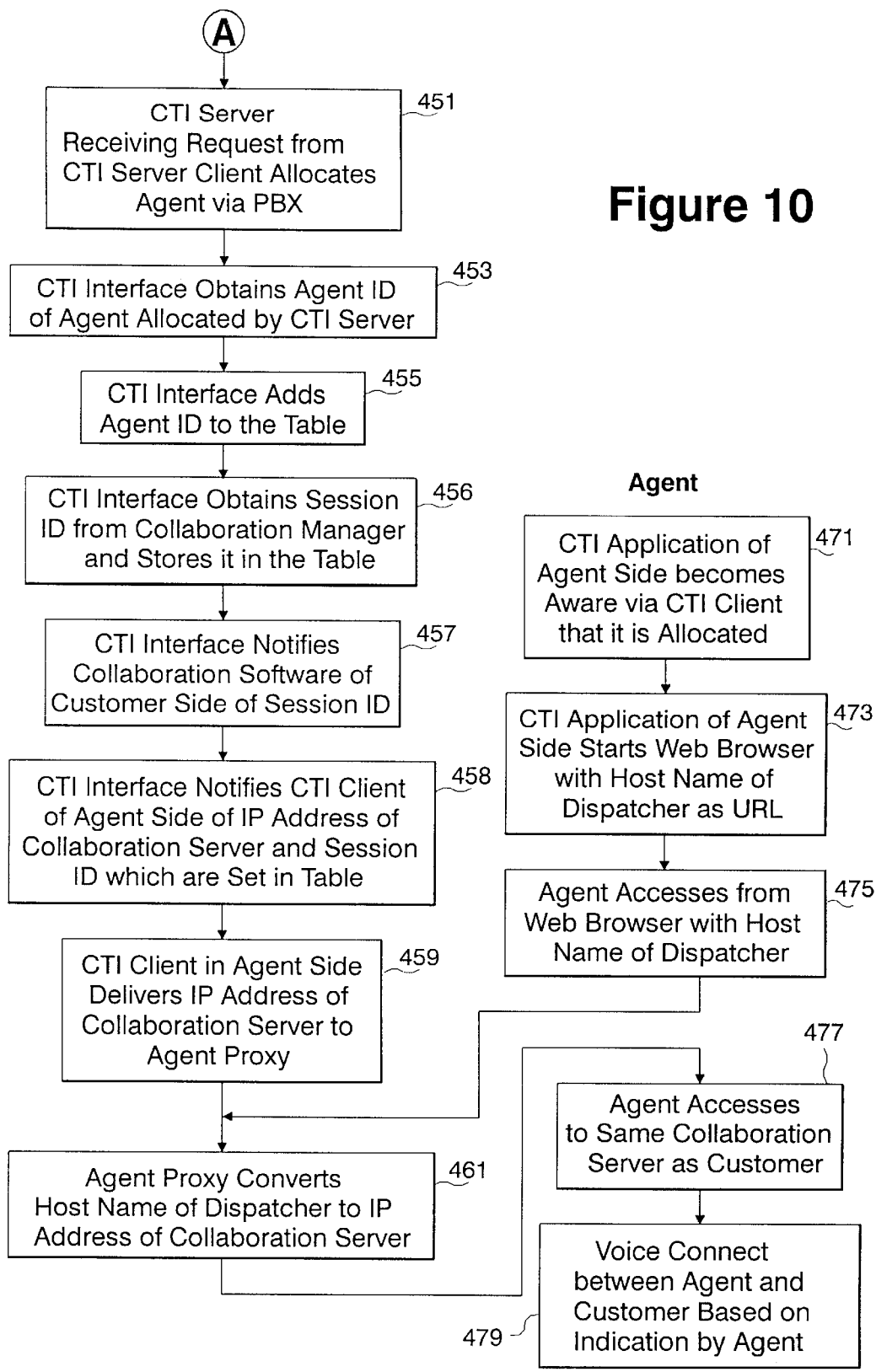
FIG. 10 is a flow chart explaining the processing procedure in the preferred embodiment of this invention.

The operation procedure of the components in the preferred embodiment of this invention is shown in FIGS. 9 and 10. First of all, the Information Terminal 110 of the customer side sends out an HTTP request to the Dispatcher 120 by specifying a URL http://www.ccservice.co.or.jp by the Web Browser 111 (step 401).

The HTTP request is allocated to a most suitable one of Collaboration Servers 142, 144, 146 by the Dispatcher (step 403). It is assumed that the request is allocated to 9.1.1.1 in this example. While the server is allocated taking the load condition of the severs in the preferred embodiment of this invention, the concept of this invention is not limited to such allocation and includes allocation depending on other attributes such as the amount of data handled.

The Collaboration Server 142 receiving this HTTP request (IP address: 9.1.1.1) first checks if the HTTP request header (see FIG. 5) has a cookie "IBMCF_UAI" in the Web Server 143 (step 405).

When the HTTP request header 320 does not have a cookie of IBMCF_UAI, the UAI Manager 147 is requested to generate a UAI. The UAI Manager 147 generates a UAI in response to this request (step 415). In the preferred embodiment of this invention, the UAI Manager 147 allocates an ID uniquely identifiable within the system as a customer ID and sets a cookie of IBM_UAI in the UAI using Set-cookie: Response Header (FIG. 4).

An HTTP response is then sent from the Web Server 143 to the Web Browser 111 as a response to the HTTP request (step 407).

Figure 11:
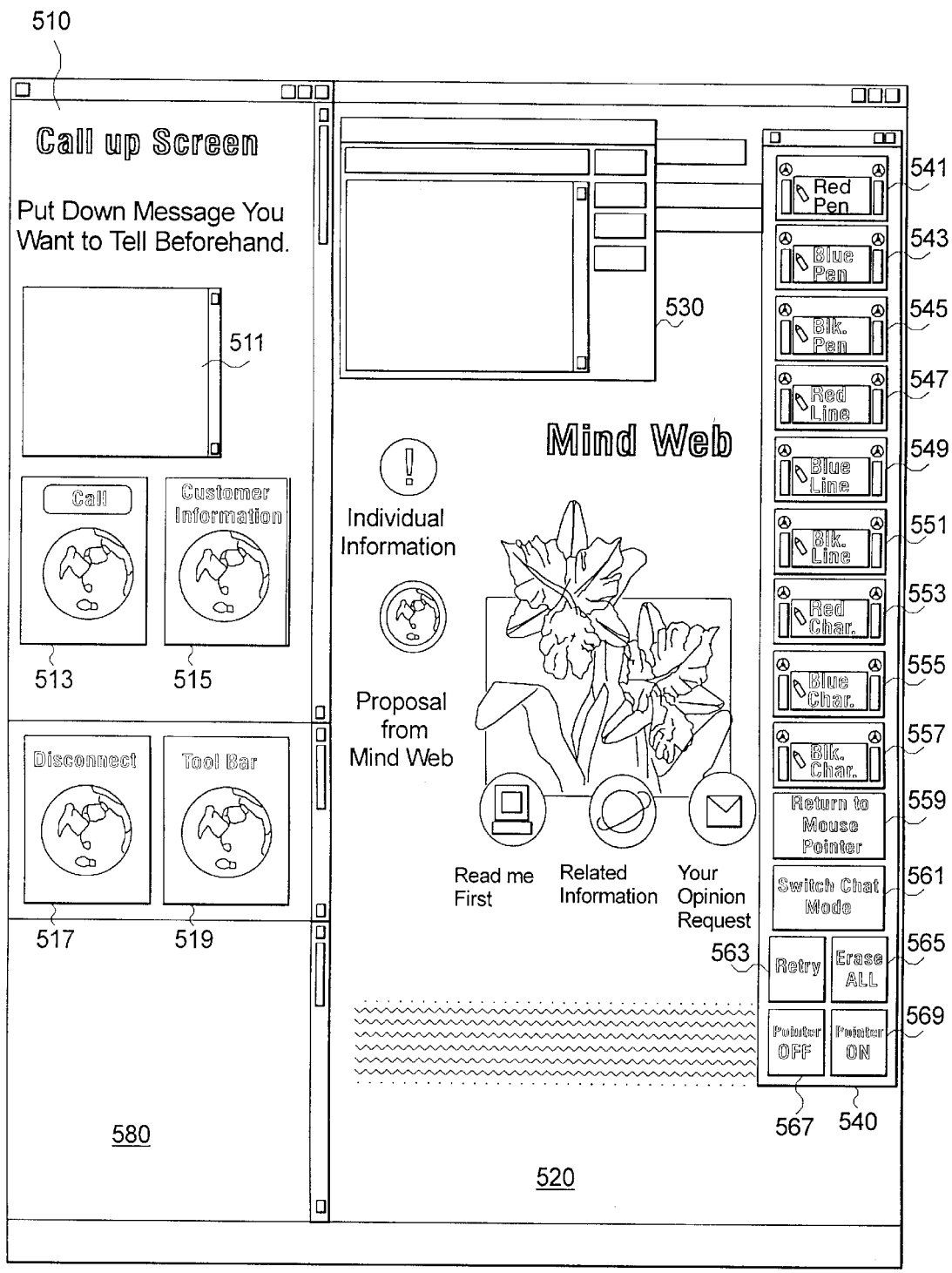
FIG. 11 is a chart showing a Web Browser of the customer side in the preferred embodiment of this invention.

FIG. 11 is a chart showing a display screen of the Information Terminal 110 of the customer side in the preferred embodiment of this invention. When a collaboration is started between the customer side and the client side by depressing a "Call up" button 513 to be described later, a collaboration control window 510, a Web Browser main window 520, a chat window 530, and a tool bar window 540 are displayed in the display screen of the information terminal in the customer side in the preferred embodiment of this invention.

The collaboration control window 510 in the preferred embodiment of this invention includes a Query Item Entry field 511, a Call up button 513, a Customer Information input button 515, a Disconnection button 517, a Tool Bar display button 519 and a Message field 580.

The Query Item Entry field 511 is a field into which a customer enters a query item and the like. The data entered here is automatically sent to an agent side when the Call up button 513 is depressed and the content of the data is displayed in a title portion of the currently focused window or in a specific window. By this, the agent can smoothly proceed a conversation because the agent can see an approximate content of the query before the conversation begins.

The "Call up" button is a button which a customer uses to call up an agent. The Collaboration Software 113 is started by the Call up button 513 and connected to the Collaboration Manager 149. The "Customer Information" button 515 is a button for displaying a Customer Information input panel 700.

FIG. 12 is a chart showing an example of the customer information panel in the preferred embodiment of this invention. In the customer information panel 700 in the preferred embodiment of this invention, entries 701, 703, 705 are disposed to input a name, a telephone number and position information. Also, an item 710 for inputting information such as "poor in keyboard operation", "poor in mouse operation", "desire visual communication", and "desire a slow explanation" can be checked.

Such information assists in conveying the physical condition of a customer and other conditions and appropriately coping with the customer when a query arrives at the agent from the customer.

The information inputted in the customer information panel 700 is saved in the cookie by depressing an "OK" button 721. Then, when the "Call up" button 513 shown in FIG. 11 is depressed, the content of the cookie is read and sent to the Collaboration Manager 149 of the Collaboration Server 142 as a parameter of a GET or POST command via the dispatcher along with information entered in the customer Query Item Entry field 511 (step 408). The Client 145 of the cluster side also recognizes receipt of a connection request.

Because the Dispatcher 120 in the preferred embodiment of this invention has a "Sticky" function to have a same collaboration server process requests which come up from a same information terminal during a given time period, the Collaboration Software 113 of the customer side can connect to the Collaboration Manager 149 in the Collaboration Server 142 allocated initially. The Collaboration Software 113 of the customer side waits a connection of the Collaboration Software 178 of the agent side and displays on the display screen of the information terminal of the customer side a message to the effect that it waits a connection of the agent side.

In the preferred embodiment of this invention, the information entered in the Query Item Entry field 511 is also saved in the cookie. This is for the purpose of obviating to input again upon depressing the "Call up" buttons again when all agents are busy and connection is given up.

Figure 13:
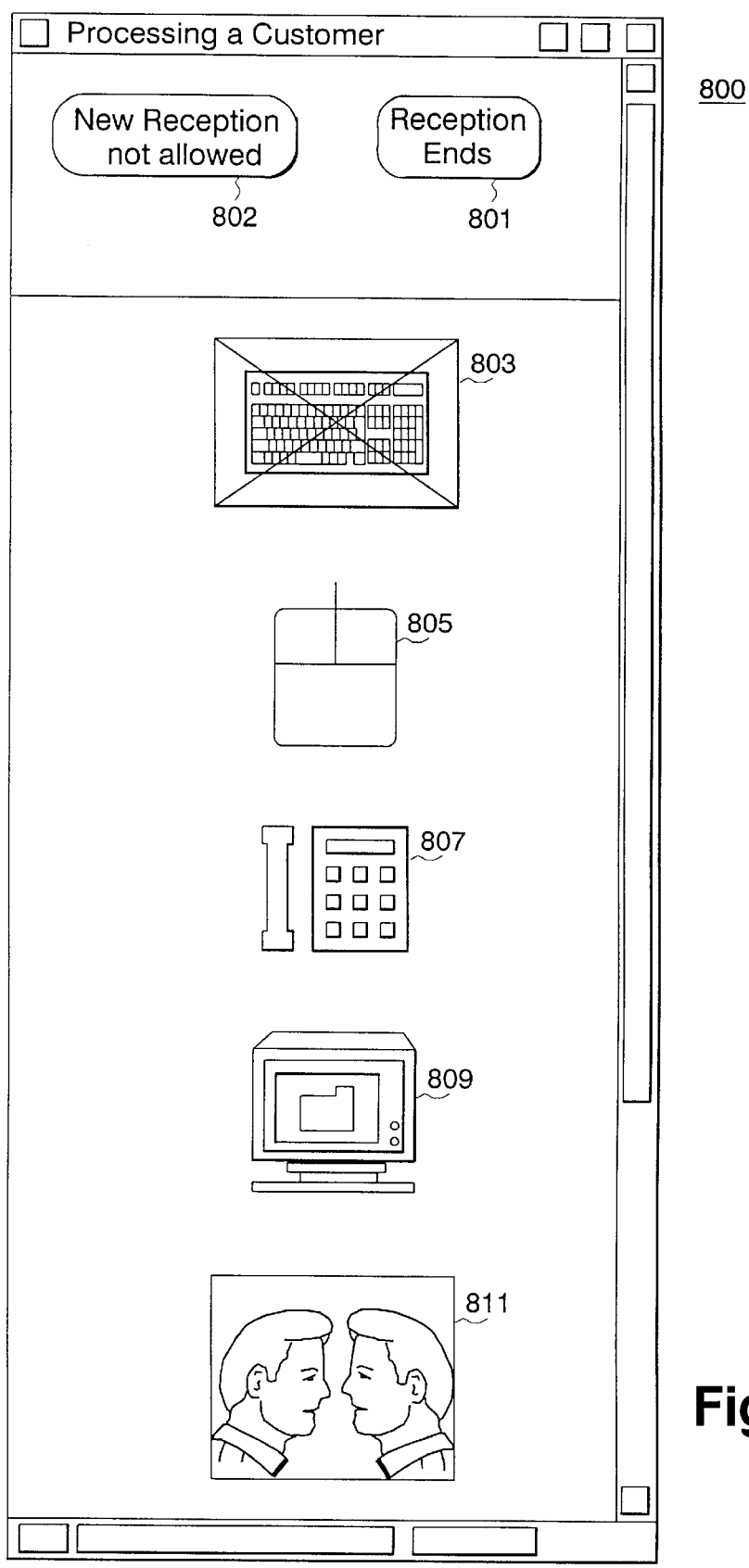
FIG. 13 is a chart showing a customer status icon display panel in the preferred embodiment of this invention.

The Collaboration Software 178 of the Information Terminal 170 of the agent side, in receiving this, analyzes the parameter and displays a frame 800 shown in FIG. 13 on the display screen. As shown in the figure, an icon corresponding to the item which the customer checked is crossed out. In this example, the customer checks the item "poor in operation of a keyboard". The keyboard icon is crossed out. While the condition of a customer and the content of a query were not known in the prior art until a conversation begins with the customer, the agent can obtain such information beforehand in this system.

Especially when the customer is a handicapped person, the response to an arriving telephone call is effective and comfortable to the customer when the agent knows the condition of the handicap beforehand. I the case of a customer who has a handicap in eye sight, for example, the agent would suitably cope with the customer by an oral conversation rather than giving a guidance like "please look at xxxx" if the agent knows customer's condition beforehand. In the case of a customer who has a handicap in hearing or speaking, a guidance could be given mainly using a tool such as Chat rather than an oral conversation from the beginning.

Especially in the case of a customer who has a handicap in hearing or speaking, chat windows 530, 630 are automatically opened upon connection in the preferred embodiment of this invention. Also, when the agent clicks a voice connection button 740 (FIG. 14), a window which requests an input of confirmation is outputted to the agent along with a message of attention. Specifically, the Collaboration Software 178 of the agent side which analyzed the parameter of a GET or POST command recognizes that the customer desires to have a conversation by Chat and starts a chat application.

When "poor in the operation of mouse" is checked, for example, the picture of the mouse is also displayed with a crossing out. The "End Reception" button 801 in the upper frame is a button which the agent depresses at the end of the work of the day to log off.

Reference is made to FIG. 11 again. The "Disconnect" button 517 is a button for disconnecting a session with the Collaboration Manager 149. In the preferred embodiment of this invention, when the session with the customer side is disconnected, the Collaboration Manager 149 also disconnects a session with the agent side and outputs hysteresis information of the session to an internal memory area.

The "Tool Bar" button 519 starts a tool bar 540 for using annotation and the like. The annotation technology is known in the art as disclosed in PUPA 10-124461.

The message field 580 is a field for displaying a system message. For example, a message corresponding to the status of the system such as "A responsible person will soon respond to you. Please wait for a second." is displayed after the customer depresses the "Call up" button 513.

On the other hand, various buttons for use in annotation are provided in the tool bar window 540 which is displayed when the "Tool bar" display button 519 is depressed in the preferred embodiment of this invention.

By clicking a "Red pen" 541, a "Blue pen" 543, a "Black pen" 545, the shape of the pointer is changed to the shape of a pen having respective color and a red, blue or black line can be drawn on the Web Browser main screen 520. Also, by clicking a "Red straight line" 547, a "Blue straight line" 549, a "Black straight line" 551, a red, blue or black line can be drawn. Further, by clicking a "Red character" 553, a "Blue character" 555, a "Black character" 557, a red, blue or black character can be inputted.

A "Restore to mouse pointer" button 559 restores the shape of the mouse pointer which has changed to the shape of a pen and the like to the normal shape of the mouse pointer. A "Switch Chat mode" button 561 switches the display mode of the window 530 of Chat. In the preferred embodiment of this invention, the chat window 530 may be selectively switched to a multi-line display as shown in FIG. 11 or to a mode of displaying a single line in the title bar of the currently focused window.

A "Retry" button 563 erases annotation drawn latest and restores it to the immediately preceding state. An "Erase all" button 565 erases all annotations so far drawn. A "Pointer on" button 567 turns a remote pointer on. The remote pointer is a pointer for instructing a position on the screen intended to the collaboration partner during a collaboration. A "Pointer off" button 569 turns the remote pointer off.

On the other hand, the CTI Client 145 of the cluster side receives a notification from the Web Server 143 via an interprocess communication and delivers the value of the UAI as a customer ID and its own IP address 9.1.1.1 to the CTI Interface 153 via a TCP/IP communication means such as a socket (step 409).

The CTI Interface 153 registers a customer ID (CI) and 9.1.1.1 in the client-agent matching table 155 described in FIG. 6 (step 411).

The CTI Interface 153 further requests the CTI Server Client 169 to allocate an agent via a TCP/IP communication means such as a socket (step 413). If there is a Firewall 133 between them in this case, the Firewall is passed through using means like SOCKS.

The CTI Server Client 169 receiving the request for allocation issues a make call API to the CTI Server to instruct to call the key number of the agent which is internally held by the CTI Server 463. The CTI Server 463 rings the bell of the key number of the agent using the PBX 165. When the agent picks up the telephone call, the extension telephone number of the agent is returned to the CTI Server 463 via the PBX 165 (step 451).

By using the additional functions of this invention, an agent who has a skill fitting the content of a customer's query can be assigned in the internet call center while the availability of agents can be informed to the customer to allow the customer to select whether to wait connection to the agent or not.

By assigning an agent who has a skill fitting the content of a customer's query with this function, a conversation between the customer and the agent can be held smoothly after connection. In addition, when the skill of the assigned agent does not match the content of the customer's query after connection to the customer, a work load of transferring to the agent having a skill matching the content of the query can be reduced in the call center side.

Figure 15:
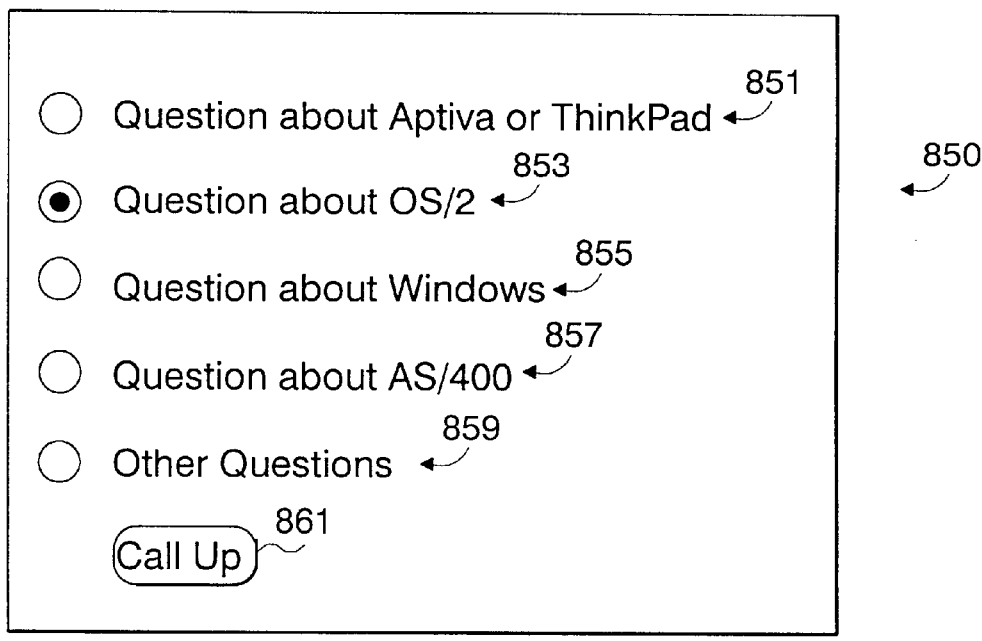
FIG. 15 is a chart showing a call up panel in the additional function of this invention.

As a user interface, the Call up button 513 shown in FIG. 11 is changed to the form shown in FIG. 15. The customer checks query contents 851 to 859 when the customer depresses the "Call up" button 863. In this example, the customer checks a query relating to OS/2. The information that the query relates to OS/2 (hereinafter referred to as "skill information") is sent to the CTI Interface 153 in the manner similar to the description of the customer information.

The CTI Interface 153 determines the skill information and selects a group of agents fitting the skill information. The following two methods are available as a specific method.

The first method queries the CTI Server or the PBX 165 as to what group of agents they have (collate the skill information with the parameter 225 of the agent managing table 220) and issues a requests to the obtained group of agents to allocate an agent.

The second method provides a table of skill information and groups of agents in the CTI Interface, searches the table and issues a request to the obtained group of agents to allocate an agent.

After selecting the group of agents, the CTI Server 163 or the PBX 165 is asked if an agent can be immediately assigned. For example, the number of agents of which the status is ready is obtained and an agent who has been ready for the longest time is assigned if the number is one or more. If the number of reedy agents is zero, the time of a customer currently placed in the queue who has been waiting longest is obtained to obtain predictive information telling that a customer who depressed the Call up button has to wait for that length of time as a minimum.

If no wait time is required, a message such as "the agent will soon call you" is displayed in the browser of the customer side. If the customer has to wait, a message such as "the agent will call you in xx minutes. do you wait?" and Yes/No button are displayed in the browser of the customer side to prompt the customer to depress Yes or No button. If No is depressed, the request for assigning the agent is terminated.

When allocation of the agent finishes, the CTI Server 163 retrieves an extension telephone number of the allocated agent from the agent managing table and requests the PBX 165 to call the extension number using this information.

On the other hand, the CTI Interface 153 obtains an ID which can identify the agent allocated by the CTI Server 163 via the CTI Server Client 169 using a TCP/IP communication means such as socket (step 453). An ID which can identify an agent is an extension telephone number of the agent, for example. In this case, when there is a Firewall 133 between then, it is passed through using means such as SOCKS.

The CTI Interface 153 registers an agent ID (1111, in this example) in the client-agent matching table 155 (step 455). The CTI Interface 153 issues a request for allocating a session ID to the Collaboration Manager 149 and stores a session ID returned from the Collaboration Manager 149 in the client-agent matching table 155 (step 456). The session ID is notified to the Collaboration Software 113 of the customer side by the CTI Interface 153 (step 457).

In the preferred embodiment of this invention, the session between the Collaboration Software 178 of the agent side and the Collaboration Manager 149 is started when the agent logs in the system and the session waits until a customer is allocated.

The session ID may be assigned beforehand to a session started between the Collaboration Software 178 of the agent side and the Collaboration Manager 149 when the agent logs in the system and also to the session which the corresponding customer is waiting after the agent has been allocated.

The CTI Interface 153 notifies the CTI Client 175 of the agent 170 identified by the agent ID (1111) of an IP address (9.1.1.1) of the collaboration server which is set in the table 155 and the session ID by a TCP/IP communication means such as socket (step 458). In the preferred embodiment of this invention, because the CTI Interface 153 was notified of a set of the agent ID (extension number) and the own IP address when the agent logged in the system, the CTI Interface 153 can directly access to the CTI Client 175. When there is a Firewall 133 between them, it is passed through using means such as SOCKS.

The CTI Client 175 delivers the IP address (9.1.1.1) of the Collaboration Server 142 received from the CTI Interface 153 via an interprocess communication to the Agent Proxy 173 (step 459).

On the other hand, a CTI Server Client Application runs in the Information Terminals 170, 172, 174 of the agent side and the servers can know that they are allocated in that application (step 471). For example, they can know that they are allocated by continuing to send a query via the CTI Server Client 169 or having the CTI Server 163 bring up an event when they are allocated. Also, they can determine that they are allocated when the IP address of the collaboration server is notified in the step 457.

The CTI Server Client Application 177, upon knowing that it is allocated, designates the name of the host of the Dispatcher 120 www.ccservice.co.jp as a URL to start the Web Browser 179 (step 473).

An HTTP request is then sent to URL http://www.ccservice.co.jp in the Web Browser 179 of the started agent side (step 475).

In the preferred embodiment of this invention, because the Agent Proxy 173 is set up to convert a given host name (www.ccservice.co.jp, in this example) to the IP address delivered in the step 459, the Agent Proxy 173 converts the IP address of www.ccservice.co.jp to 9.1.1.1 (step 461) and the agent can also access to the Collaboration Server 142 which has the IP address of 9.1.1.1 (step 477).

Figure 14:
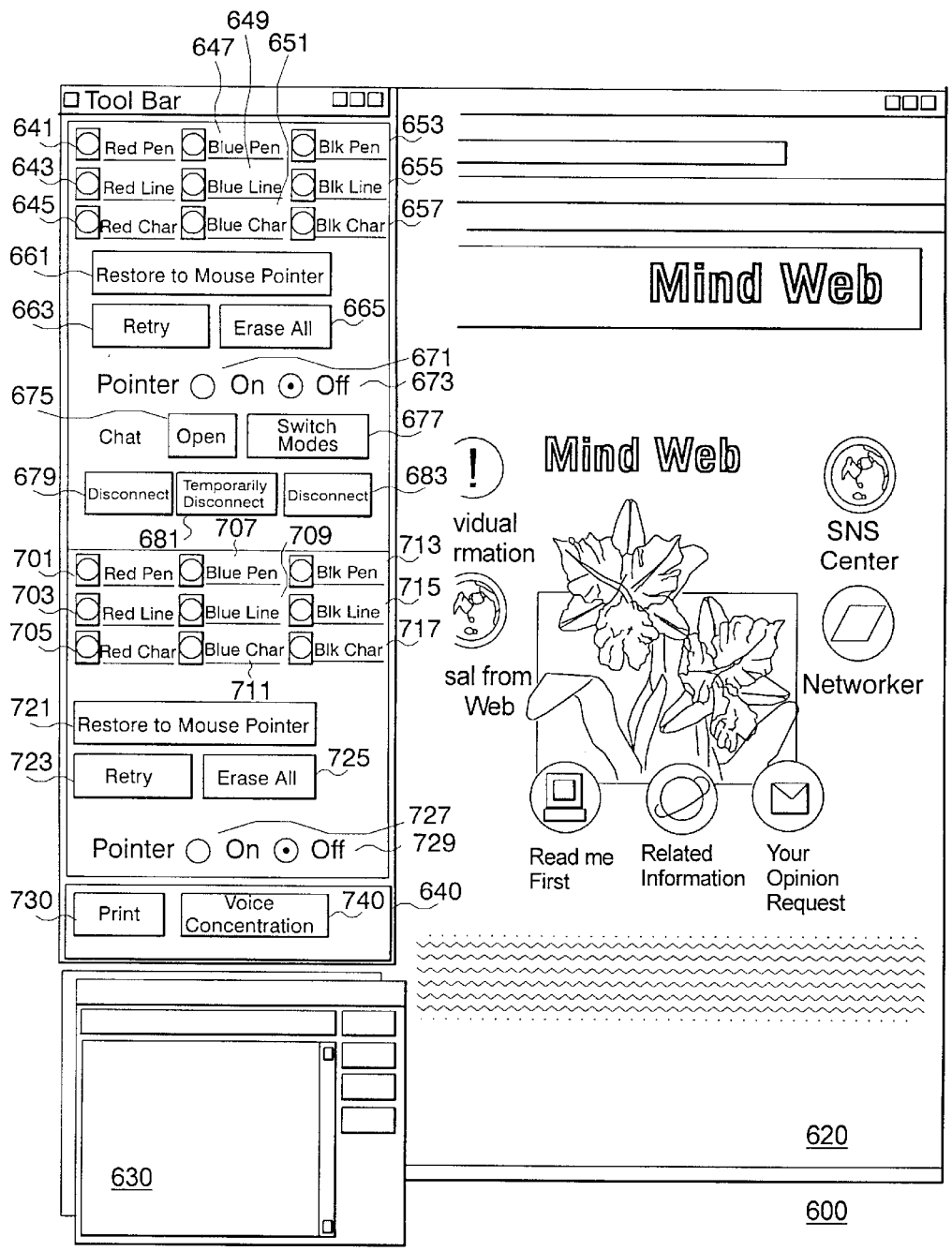
FIG. 14 is a chart showing a Web Browser of the agent side in the preferred embodiment of this invention.

FIG. 14 shows a screen which is displayed when the Information Terminal 170 of the agent side accesses to the Collaboration Server 142 to collaborate. As shown in the figure, a collaboration control window 640, a Web Browser main window 620 and a chat window 630 are displayed in the display screen of the Information Terminal 170 of the agent side in the preferred embodiment of this invention.

The upper half of the collaboration control window 640 in the preferred embodiment of this invention is a tool effective to the display screen of the agent side while the lower half excluding a "Print" button 730 and a voice connection button 740 is for a remote control of a tool in the customer side. The function of the buttons provided in the collaboration control window 640 is same as those described in the tool bar 540 of the customer side.

Buttons which are not in the tool bar 540 of the customer side but are provided in the collaboration control window 640 include a Print button 683, a Disconnect button 679, a Temporarily Disconnect button 681, a Reconnection button 683, and a Chat window open button 675.

The Print button 730 sends an annotated screen to a printer. This is provided because an annotation is not printed in the print function of a normal Web Browser. The Disconnect button 679 disconnects a session with the Collaboration Server 142. The Temporarily Disconnect button is used to temporally disconnect a session with the Collaboration Server 142. For example, this is a convenient function when only the agent wants to go to another URL for confirmation. The Reconnection button 683 is used to recconect when temporally disconnected. The Chat window open button 675 opens a Chat window. When this button is depressed, Chat windows 530, 630 open in the agent and the customer sides. The technology relating to a remote control is not described in detail because it is known in the art.

The Voice Connection button 740 is a button for an agent to Voice connect to a customer manually. When the Voice Connect button 740 is depressed, a message including information of an agent ID (extension telephone number) and a customer ID is sent to the CTI Server Client 169.

The CTI Server Client 169 receiving this message instructs the CTI Server 163 to voice connect between the customer and the agent. The CTI Server 163 obtains the customer's telephone number from the customer information managing table 240 and instructs the PBX 165 to connect the extension number of the agent to the telephone of the customer (step 479). While the telephone number of the customer is obtained from the customer information managing table 240 in the preferred embodiment of this invention, a customer's telephone number registered beforehand in a database which the system can utilize may be obtained using a customer ID and the like as a key.

In another mode of this invention, the system may automatically voice connect without the voice connection button being depressed by the agent. In this case, a message instructing connection and including information of an agent ID (extension telephone number) and a customer ID are sent to the TCI Server Client 169 from the agent side in response to delivery of the customer ID from the CTI Interface to the agent side along with the IP address of the collaboration server in the step 457.

Figure 16:
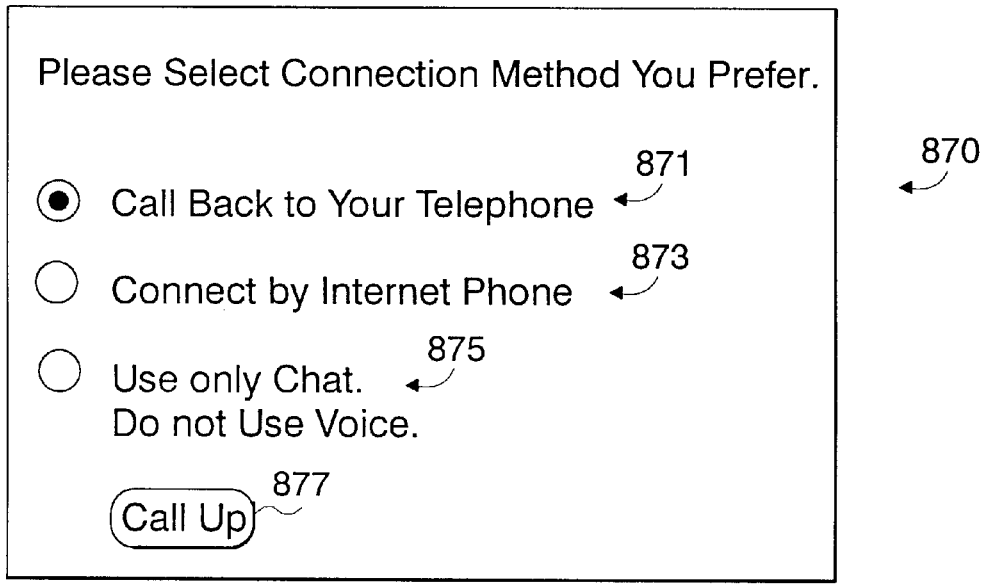
FIG. 16 is a chart showing a communication means selection screen in the preferred embodiment of this invention.

In one mode of this invention, communication means can be selected in being called back in the customer side as shown in FIG. 16. In the case of an internet call center, for example, the method of communicating with an agent by a voice depends on the number of lines in the customer side. When there is only one line, a voice communication is impossible because a connection is already made to the web (it is possible if a portable telephone is used) so that it may be desired to communicate using an internet phone.

Because communication means is decided for connection depending on the status of the customer side with this invention, the agent can communicate without worrying about the type of connection to be decided and operation to decide.

In the example of FIG. 16, the customer can select one of a connection by a public telephone network 871, a connection by an internet 873 and a communication by Chat 875. While two lines or a portable telephone and the like are necessary in the case of a connection by a public telephone network, one line is enough in the case of a connection by an internet or a communication by Chat. Chat is especially useful when the customer has a handicap in hearing.

Figure 17:
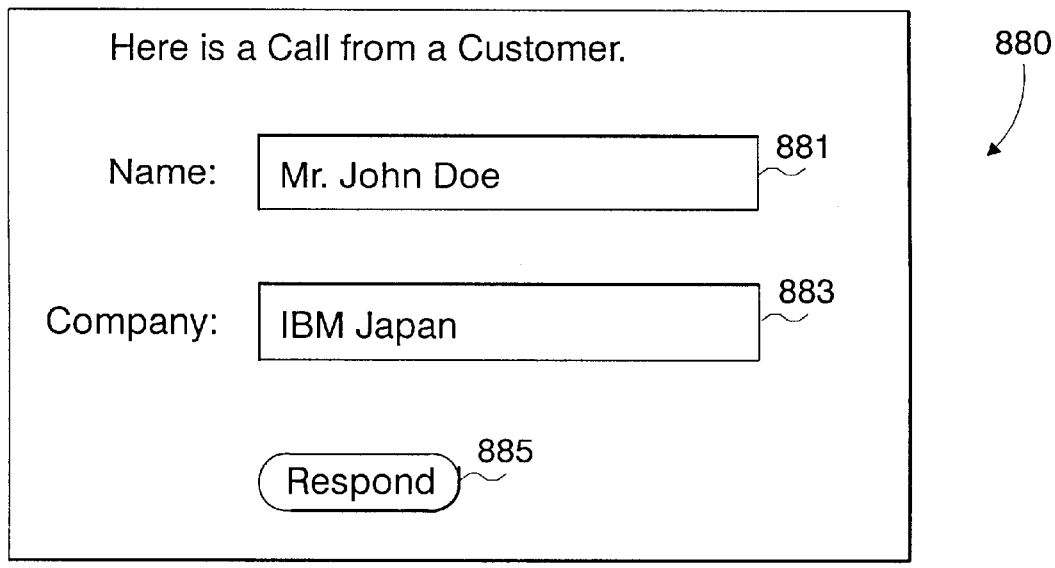
FIG. 17 is a chart showing a arrival message which is outputted in the information terminal of the agent side in the preferred embodiment of this invention.

When the customer depresses the "Call up" button 877 after specifying the communication means, this information is sent to the CTI Server Client Application 177. The Server Client Application 177 receiving this information extracts received information and customer information from the customer information managing table 240 and outputs a message as shown in FIG. 17 to the Information Terminal 170 of the agent side.

Figure 18:
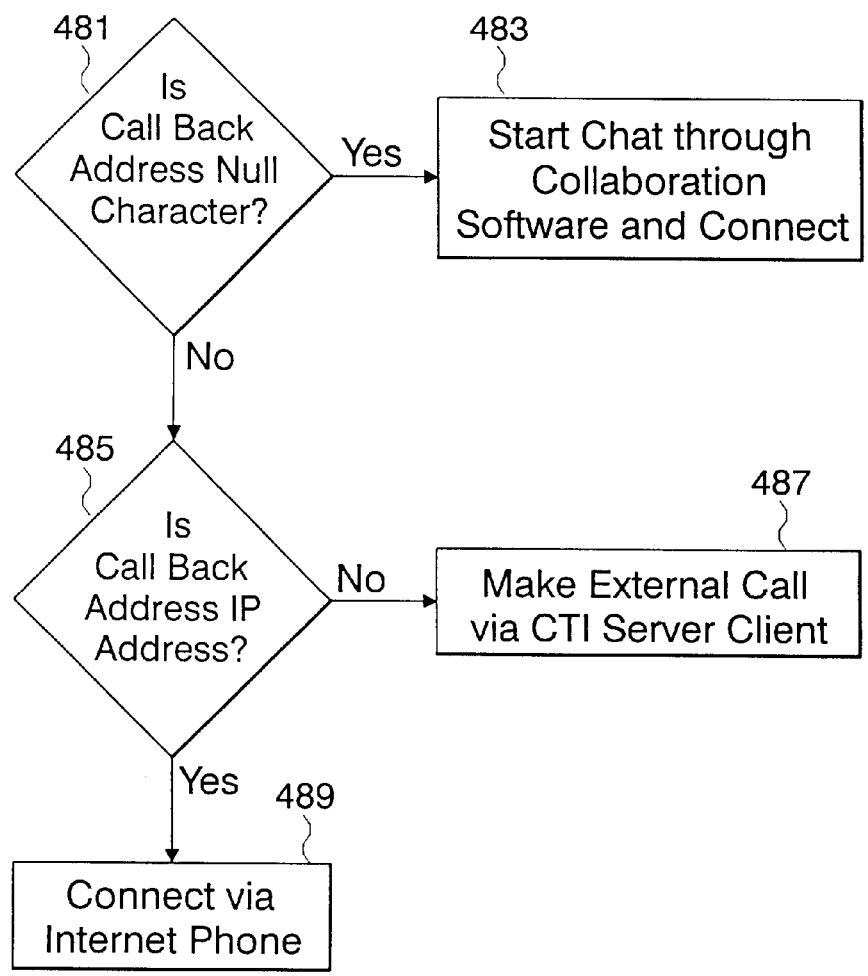
FIG. 18 is a flow chart showing the communication means deciding procedure in the preferred embodiment of this invention.
Figure 19:
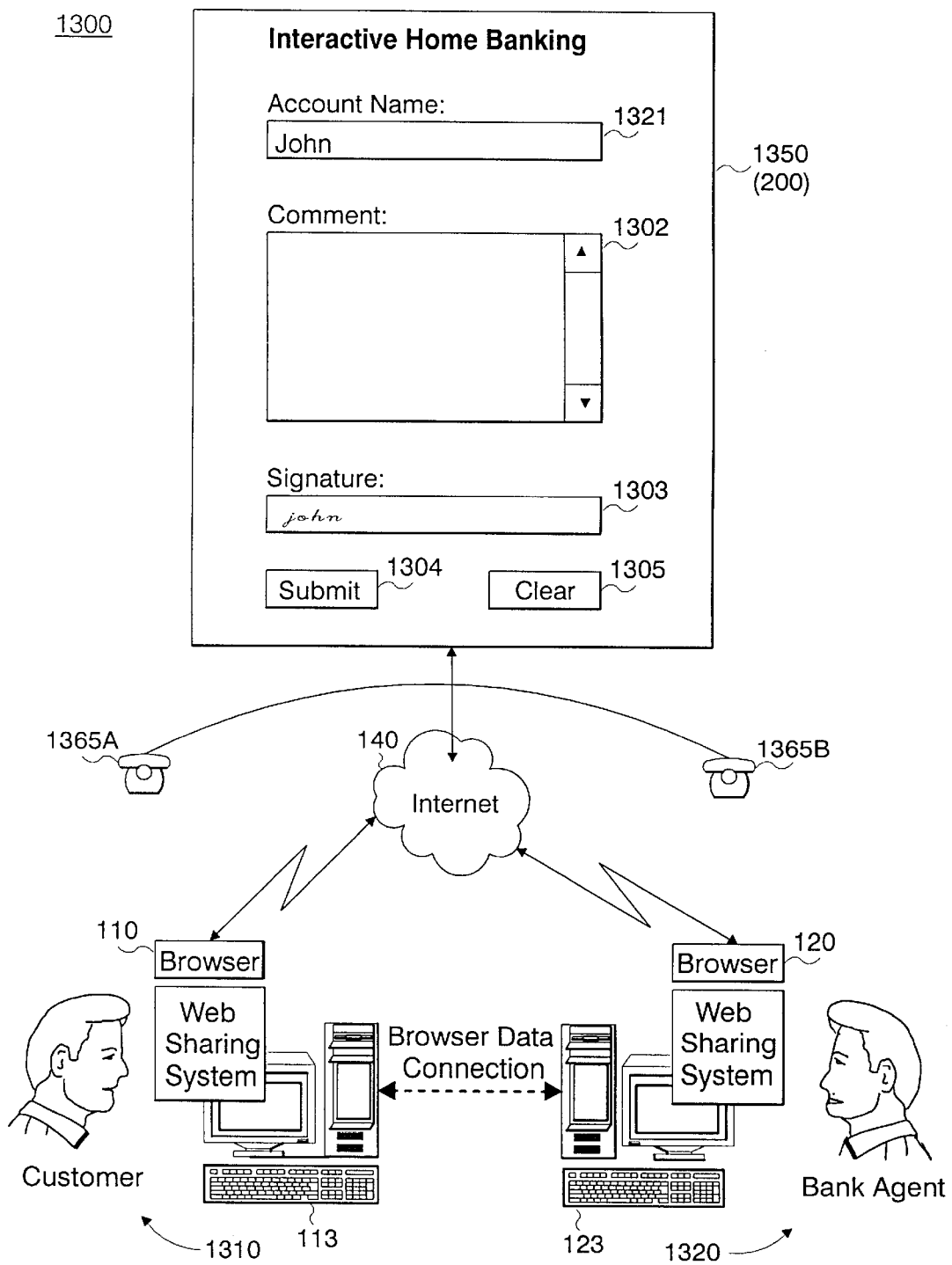
FIG. 19 is a diagram explaining a conventional collaboration technology.
Figure 20:
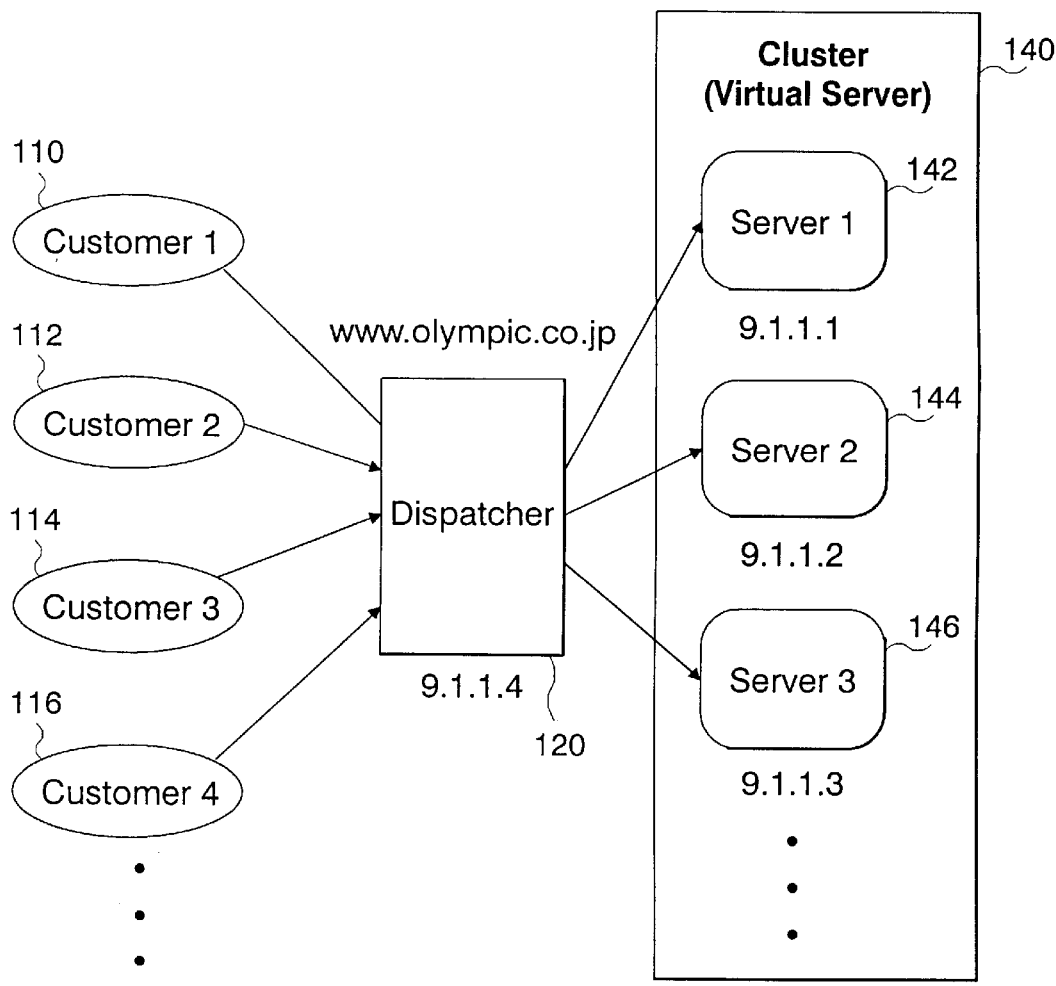
FIG. 20 is a diagram showing a conventional dispatch technology.

The agent can be aware of a call from the customer because an arrival screen "call from customer" is then displayed and the bell of the agent's head set rings. When the agent clicks a response button 885, the CTI Server Client Application 177 identifies the communication means as shown in FIG. 18.

The CTI Server Client Application 177 checks whether call back information (call back address) included in the message received from the customer side is a null character (step 481).

When it is determined that the call back address is a null character, chat applications in the agent and the customer sides are started using the Collaboration Software 113, 178 (step 483).

When it is determined that the call back address is not a null character, the CTI Server Client Application 177 further checks whether the call back address is in the format of an IP address (step 485).

When it is determined that the call back address is not in the format of an IP address, an external call is made using the CTI Server Client 168 (step 487).

When it is determined that the call back address is in the format of an IP address, the CTI Server Client Application 177 starts internet applications in the agent and the customer sides using the Collaboration Software 113, 178 and connects (step 489).

While this invention has been described in the mode of using a browser, this invention is a technology applicable to a communication system using other protocol than the internet protocol because it is enough for this invention to be an information terminal supporting server which can provide a specific service in a centralized fashion to a plurality of sessions requesting from an information terminal to a server.

As described in the above, in having one of a plurality of servers process a request sent from an information terminal via a network, this invention allows said one of the servers to be specified and accessed from other information terminal. In addition, even if the request from the information terminal is allocated by a dispatcher, this server can be accessed from other information terminal without intervening the dispatcher.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method of communicating between a first information terminal and a second information terminal, said method comprising the steps of;
   (a) receiving, at one of a plurality of servers managed by a dispatcher, a first request sent to an address of a cluster of the dispatcher from said first information terminal,
   (b) allocating information which can specify said first information terminal in said one of the plurality of servers,
   (c) receiving a second request from said first information terminal, requesting connection to a second information terminal,
   (d) storing said information which can specify said first information terminal and information which can specify said one of the plurality of servers in correlation to each other,
   (e) specifying a second information terminal to be connected to said one of the plurality of servers,
   (f) in response to step (e), accessing to said one of the plurality of servers from said second information terminal based on the information specifying said one of the plurality of servers which were stored in the step (d), and
   (g) communicating between said first information terminal and said second information terminal.

2. A method of communicating between a first information terminal and a second information terminal, said method comprising the steps of;
   (a) receiving a first request sent from a Web Browser of a first information terminal to an address of a cluster of a dispatcher to a Web Server of one of a plurality of servers managed by said dispatcher,
   (b) allocating information which can specify said first information terminal in said one of the plurality of servers,
   (c) sending to said first information terminal a response including a content which displays information which can specify said first information terminal, an object instructing to connect to a second information terminal, and an entry for inputting a telephone number of the operator of said first information terminal on a display device of said first information terminal, (d) receiving a second request requesting connection to the second information terminal and including information which can specify said first information terminal and a telephone number of the operator of said first information terminal, said second request being generated by operating said object in said first information terminal, (e) storing said information which can specify said first information terminal and the information which can specify said one of the plurality of servers in correlation to each other, (f) storing the telephone number of the operator of said first information terminal and information which can specify said first information terminal in correlation to each other, (g) specifying a second information terminal to be connected to said one of the plurality of servers, (h) storing information which can specify said second information terminal and information which can specify said first information terminal in correlation to each other, (i) accessing to said one of the plurality of servers from said second information terminal based on the information specifying said one of the plurality of servers which were stored in the step (e), and (j) communicating between said first information terminal and said second information terminal.

(k) sending a third request instructing a voice connection and including information which can specify the telephone number of the operator of said second information terminal in response to an operation instructing a voice connection of said second information terminal, and (l) connecting the telephone of the operator of said first information terminal to the telephone of the operator of said second information terminal in response to the third request.

3. A method of communicating between a first information terminal and a second information terminal, said method comprising the steps of;

(a) connecting said first information terminal to one of a plurality of servers based on address information received at said one of the plurality of servers which can support said first information terminal, said address information being obtained by said first information terminal from a dispatcher managing said plurality of servers, (b) storing information which can specify said first information terminal and information which can specify said one of the plurality of servers in correlation to each other, (c) connecting a second information terminal desiring communication with said first information terminal to said one of the plurality of servers based on information specifying the one of the plurality of servers which was stored in said step (b), and (d) in response to step (c), communicating between said first information terminal and said second information terminal.

4. A method of accessing to one of a plurality of servers, which are under the management of a dispatcher, by a second information terminal desiring communication with a first information terminal, said method comprising the steps of, (a) storing information which can specify one of the plurality of servers managed by said dispatcher and is accessed from the first information terminal via said dispatcher, and information which can specify said first information terminal in correlation to each other, (b) storing information which can specify the second information terminal in correlation to the information stored in step (a); and (c) accessing to said one of the servers from the second information terminal based on information specifying the one of the servers which was stored in said step (a).

5. A Communication System supporting communication between a first information terminal and a second information terminal, said system comprising;

(a) a Dispatcher for managing a plurality of servers and allocating a first request from the first information terminal to one of said plurality of servers, (b) a UAI Manager for allocating information which can specify said first information terminal, (c) a Collaboration Manager for supporting a Collaboration Software installed in said first and said second information terminals, (d) a CTI Interface for managing a managing table which stores information which can specify said first information terminal, information which can specify said one of the plurality of servers, and information which can specify said second information terminal in correlation to each other, (e) a CTI Server for specifying the second information terminal to be connected to said first information terminal, and (f) an Agent Proxy for accessing to said one of the plurality of servers from said second information terminal based on information specifying said one of the plurality of servers which is obtained from said managing table.

6. A communication system supporting communication between a first information terminal and a second information terminal, said system comprising;

(a) a Web Browser for sending a first request from the first information terminal, (b) a Dispatcher for managing a plurality of servers and allocating the first request to one of said plurality of servers, (c) a UAI Manager for allocating information which can specify said first information terminal, (d) a Web Server for sending to said first information terminal a response including a content which displays on a display device of said first information terminal, information which can specify said first information terminal, an object instructing to connect to a second information terminal, and an entry for inputting a telephone number of the operator of said first information terminal, (e) a CTI Interface for sending a message instructing to specify the second information terminal, which is to communicate with said first information terminal, in response to transmission of a second request requesting connection to the second information terminal and including information which can specify said first information terminal and a telephone number of the operator of said first information terminal, said second request being generated by operating said object in said first information terminal, (f) a Matching Table for storing the information which can specify said first information terminal, the information which can specify said second information terminal and information which can specify said one of the plurality of servers in correlation to each other, (g) a Managing Table for storing the telephone number of the operator of said first information terminal and information which can specify said first information terminal in correlation to each other, (h) an Agent Proxy for accessing to said one of the plurality of servers from said second information terminal based on the information specifying said one of the plurality of servers which is obtained from said matching table, (i) a CTI Server/Client Application for sending a third request instructing a voice connection and including information which can specify the telephone number of the operator of said second information terminal in response to an operation instructing a voice connection of said second information terminal, and (j) a PBX for connecting the telephone of the operator of said first information terminal to the telephone of the operator of said second information terminal in response to the third request.

7. A recording medium storing a control program for accessing to one of a plurality of servers, which are under the management of a dispatcher, from both of first and second information terminals, said program including a program code which contains instructions for accessing a managing table storing information which can specify the one of the plurality of servers accessed from said first information terminal via said dispatcher and information which can specify said first information terminal in correlation to each other; and instructions for accessing said one of the plurality of servers from said second information terminal based on a matching table storing the information which can specify said first information terminal, information which can specify said second information terminal and the information which can specify said one of the plurality of servers in correlation to each other.

* * * * *